United States Patent
Becavin et al.

(10) Patent No.: US 11,201,430 B2
(45) Date of Patent: Dec. 14, 2021

(54) POWER CONNECTION ASSEMBLY COMPRISING A CONNECTION MODULE AND ELECTRIC CABLE TERMINATIONS TO BE LOCKED IN/UNLOCKED FROM THE MODULE IN A DESIRED INSERTION POSITION, TERMINAL BLOCK COMPRISING A PLURALITY OF INDEPENDENT CONNECTION MODULES

(71) Applicant: RADIALL SA, Aubervilliers (FR)

(72) Inventors: Patrice Becavin, Auzouer en Touraine (FR); Kévin Castillon, Saint Martin le Beau (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 16/911,769

(22) Filed: Jun. 25, 2020

(65) Prior Publication Data
US 2020/0412047 A1 Dec. 31, 2020

(30) Foreign Application Priority Data
Jun. 26, 2019 (FR) ...................................... 1906939

(51) Int. Cl.
*H01R 4/50* (2006.01)
*H01R 13/514* (2006.01)
(Continued)

(52) U.S. Cl.
CPC ............ *H01R 13/514* (2013.01); *B64D 41/00* (2013.01); *H01R 13/518* (2013.01); *H01R 13/6277* (2013.01); *H01R 2201/26* (2013.01)

(58) Field of Classification Search
CPC .............. H01R 13/514; H01R 13/518; H01R 13/6277; H01R 2201/26; B64D 41/00
(Continued)

(56) References Cited

U.S. PATENT DOCUMENTS

| | | | |
|---|---|---|---|
| 2,441,393 A | 5/1948 | Stephen et al. | |
| 3,206,717 A | 9/1965 | Brown et al. | |

(Continued)

FOREIGN PATENT DOCUMENTS

| | | |
|---|---|---|
| CN | 106025714 B | 8/2018 |
| JP | 2013-251148 A | 12/2013 |

OTHER PUBLICATIONS

European Office Action dated Oct. 23, 2020 for corresponding European Application No. EP 20 18 0865.
(Continued)

*Primary Examiner* — Khiem M Nguyen
(74) *Attorney, Agent, or Firm* — Pearne & Gordon LLP

(57) ABSTRACT

Power connection assembly including a connection module and electric cable terminations to be locked in/unlocked from the module in a desired insertion position. Terminal block includes a plurality of independent connection modules. A cavity in the body of a connection module is provided into which it is possible to insert an electric cable termination that is able to be fastened and locked in at least two separate insertion positions, preferably a multitude thereof, through sliding/translational movement of a locking plate over the body that is provided with reliefs, preferably ridges that interleave in complementary reliefs, preferably ridges of the sleeve of the termination.

18 Claims, 21 Drawing Sheets

(51) Int. Cl.
  *B64D 41/00* (2006.01)
  *H01R 13/518* (2006.01)
  *H01R 13/627* (2006.01)

(58) Field of Classification Search
  USPC .................................................. 439/345–356
  See application file for complete search history.

(56) References Cited

U.S. PATENT DOCUMENTS

| | | | | |
|---|---|---|---|---|
| 3,577,117 A | * | 5/1971 | Bruetsch ................ | H01R 31/02 |
| | | | | 439/787 |
| 3,716,821 A | * | 2/1973 | Appleton ............... | H01R 13/18 |
| | | | | 439/787 |
| 4,653,839 A | * | 3/1987 | Powell ................. | H01R 13/436 |
| | | | | 439/650 |
| 5,230,634 A | | 7/1993 | Yamaguchi et al. | |
| 2009/0011637 A1 | | 1/2009 | Kim | |

OTHER PUBLICATIONS

French Search Report dated Mar. 13, 2020 for corresponding French Application No. 1906939.

* cited by examiner

POWER CONNECTION ASSEMBLY COMPRISING A CONNECTION MODULE AND ELECTRIC CABLE TERMINATIONS TO BE LOCKED IN/UNLOCKED FROM THE MODULE IN A DESIRED INSERTION POSITION, TERMINAL BLOCK COMPRISING A PLURALITY OF INDEPENDENT CONNECTION MODULES

CROSS-REFERENCE TO RELATED APPLICATIONS

This application claims the benefit of French Application No. FR 19 06939, filed on Jun. 26, 2019, the entire disclosure of which is hereby incorporated herein by reference.

TECHNICAL FIELD

The present invention relates to the field of electric power connectors.

It relates more particularly to terminal blocks.

A "terminal block" is a device for creating electrical continuity between a cable and another part of the installation. A terminal block, also known by the name connection terminal or screwed terminal, is an electrically insulated module that fastens together two or more electric wires/cables that are intended to be electrically connected to one another, and comprises an insulating support and at least one tightening component for fastening the wires/cables.

"Contact" is understood here and in the context of the present invention to mean an element made of electrically conductive material for channeling electric current.

Although it is described with reference to one preferred application, that of aeronautics, and more particularly the wiring of aircraft, the invention may be implemented in any other application that requires a power connection between a large number of electric cables/wires in a joining area.

PRIOR ART

One of the operations in wiring aircraft is that of electrically connecting a large number of electric power cables/wires to one another.

This operation is usually implemented using a screwed terminal block, fastened to the structure of the aircraft, and in which the plurality of electric cables/wires are inserted and then fixed by tightening.

FIGS. 1 and 2 show one example of such an existing terminal block, denoted overall by the reference 1, which is designed to connect two or more electric cables 2 equipped with lugs 20 at their ends by way of a screw and nut system.

This terminal block 1 firstly comprises an electrically insulating support 10 in which there are fastened terminal screws 11 that each form, with a nut 12, a screw and nut system for clamping the lugs 20 fitted to the cables 2.

An electrically conductive washer 13, which is a wave washer, is provided for each screw and nut system.

An electrically conductive bar 14 is passed through by each terminal screw 11. This bar 14 forms a bearing surface for the cable lugs 20 and thus constitutes an electric shunt between the cables 2 to be electrically connected. This plate 14 is optional and each screw 11 is electrically independent. Alternatively, the plate 14 may extend over only a partial length and electrically connect only some of the screws.

The support 10 is fastened to an aircraft structure S by column screws 15.

A cover 16 held by the column screws 15 forms a protective cover for the screw and nut systems 11, 12.

Since the terminal block 1 is not sealtight, an additional cover, commonly called an "umbrella", is fastened to the structure of the aircraft, above the terminal block, in order to prevent condensed moisture from dripping directly onto the cables 2 connected in the terminal block.

In addition to this non-sealtight aspect, such a screwed terminal block 1 has numerous major drawbacks.

First of all, the lugs 20 have to be oriented perfectly in order to be threaded around the terminal screws 11 for a satisfactory electrical connection. More often than not, this means that an operator has to untwist the cables 2.

The excess length of the cables, that is to say the additional length on the nominal side in order to compensate for wiring variations, or by contrast the shortage of length is difficult to manage for an operator at the terminal block 1, due to the rigidity of the cables 2, several of which may be joined to one another upstream of the terminal block. This excess length is all the more detrimental to an operator when he has untwisted the cables 2.

The number of components to be managed (screws, nuts, washers, shunt bar, cover, umbrella component) by an operator responsible for assembly is significant, with an additional high risk of loss of components, which therefore leads to a risk of foreign object damage (FOD) or mechanical debris that may cause damage, it being sought to absolutely avoid this in the field of aeronautics.

This risk of loss of components is all the greater when the areas in which the existing terminal blocks 1 are installed are difficult to access and/or highly restricted in terms of access and/or have a location that is inconvenient for the operator. For example, the insulating support 10 is usually fastened on the side of the ceiling in the structure of an aircraft.

In addition to intrinsic tightening operations using screws, which may take a long time for a dedicated operator, another operator is dedicated to systematically checking the tightening torques applied in order to fasten the lugs 20 of the cables.

Therefore, a screwed terminal block requires the cables not to be powered in order to avoid electrical risks for the operators responsible for the electrical connection. Moreover, these risks are not able to be completely eliminated during tests for checking correct operation.

Ultimately, the installation time for a screwed terminal block is thus lengthy.

Lastly, screwed terminal blocks do not allow modularity, since the number of cables 2 that are able to be connected in just one terminal block is fixed.

There is therefore a need to further improve existing terminal blocks, in particular in order to afford greater modularity, to facilitate installation, more particularly in areas with restricted access and/or for a large number of electric wires/cables to be connected, and to protect the operators responsible for the connection against electrical risks.

The invention aims to meet this need in full or in part.

DESCRIPTION OF THE INVENTION

To this end, one subject of the invention, according to one of its aspects, is an electrical connection assembly, comprising:
- at least one electric cable termination, with a longitudinal axis (X1), comprising a sleeve and a preferably cylindrical contact held inside the sleeve, the contact being intended to be crimped to an electric cable, the sleeve comprising ridges on its outer periphery;

at least one electrical connection module, with a longitudinal axis (X), comprising:

a body made of an electrically insulating material comprising at least two cavities each designed to house one contact of one of the electric cable termination, an electrically conductive tube, designed to connect at least one electric cable termination to another electrically conductive element, at least one latch, preferably in the shape of a U, comprising reliefs arranged towards the inside of each lateral side, the latch being designed to slide over the body between an unlocking position and a locking position in which the reliefs of the latch are interleaved in the complementary reliefs of a sleeve of one of the electric cable terminations so as to block said electric cable termination in translation with respect to the body, in a position in which said electric cable termination is inserted into the cavity of the body chosen from among at least two possible positions.

The reliefs of the sleeve are advantageously reliefs that repeat along its longitudinal axis (X1).

Again advantageously, the reliefs of the latch are reliefs that repeat along the longitudinal axis (X) of the module.

The repeating reliefs of the sleeve are preferably identical to those of the latch.

According to one advantageous variant, the repeating reliefs are ridges.

The possible insertion positions of each termination are preferably between a first extreme insertion position, in which it is locked in a cavity from above by it being impossible to interleave with reliefs of the U-shaped latch sliding into the reliefs of the sleeve of the termination, and a second extreme insertion position, in which its sleeve comes into longitudinal abutment against the conductive tube.

According to one embodiment, the module may comprise at least two latches, preferably U-shaped latches, designed to slide over the body independently of one another.

According to another embodiment, the electrical connection assembly comprises two aligned cavities of the module, preferably parallel to the longitudinal axis (X) of the module.

According to yet another embodiment, the module comprises at least two rows of two cavities arranged on top of one another. According to this embodiment, the two conductive tubes housed in the rows of cavities may be electrically connected to one another by an electric shunt, or not be electrically connected to one another.

According to one advantageous variant embodiment, there may be provision for at least one identification marker that, if it/they remain(s) visible after the insertion of a cable termination, signify/signifies that it is impossible to lock the termination.

Advantageously, the module comprises one or more gaskets arranged on the outer periphery of a contact in a contact area with the sleeve in which it is connected, preferably crimped. In other words, the invention consists essentially of a cavity in the body of a connection module into which it is possible to insert an electric cable termination that is able to be fastened and locked in at least two separate insertion positions, preferably a multitude thereof, through sliding/translational movement of a locking plate over the body that is provided with reliefs, preferably ridges that interleave in complementary reliefs, preferably ridges of the sleeve of the termination.

This translational movement with interleaving of the complementary reliefs (ridges) ensures individual locking of each electric cable termination to the module.

All of the electric cable terminations that are fastened and thus locked create desired electrical connections to one another.

Another subject of the invention is a terminal block connection assembly, intended in particular to connect a plurality of electric cables to one another, comprising:

at least one connection assembly as described above, the at least one electrical connection module of which furthermore comprises:

at least one positioning piece projecting from the body towards the outside of the module, at least one locking plate, designed to slide over the body between a locking position and an unlocking position, the locking plate comprising a locking relief;

at least one support rail, intended to be fastened to a structure, in particular an aircraft structure, comprising:

at least one insertion groove, designed for the insertion of the positioning piece, at least one fastening groove in the extension of the insertion groove, the fastening groove being designed to allow the module to be fastened through the translational movement of the positioning piece from the insertion groove;

at least one locking relief, designed to interact with the complementary locking relief of the plate when the positioning piece is moved in translation, so as to slide the plate from its unlocking position to its locking position, and thus to lock the fastening of the connection module to the support rail.

Another subject of the invention is an electric cable termination, with a longitudinal axis (X1), comprising a sleeve and a preferably cylindrical contact held inside the sleeve, the contact being intended to be connected, preferably crimped, to an electric cable, the sleeve comprising reliefs on its outer periphery, the reliefs being configured to ensure the locking in translation, of the electric cable termination in an electrical connection module.

According to an advantageous variant, the sleeve comprises an area without reliefs at its front end.

According to another advantageous variant, the sleeve comprises at least one identification marker, in particular a colour mark, which, if it remains visible after insertion of the termination, signifies that it is impossible to lock the termination.

A subject of the invention is also a terminal block, comprising a plurality of electrical connection modules of a connection assembly as described above, of same or different sizes, with cavities of same or different sizes for housing terminations of electric cables of same or different sizes.

The invention finally relates to an aircraft structure, comprising a support rail to which at least one terminal block as described above is fastened.

The invention has numerous advantages over what exists, among which mention may be made of:

an improvement in the installation times for installing electric cables in a structure, in particular an aircraft structure, using a quick assembly system that may be implemented without tools;

individually coupling each electrical termination in a single-cavity or multi-cavity connection module;

compensating for the excess lengths or shortages of length of the cables within a connection module;

eliminating cable orientation problems by replacing the usual lugs with cylindrical contacts;

protecting operators against electrical risks, due to the fact that they no longer have to handle electrically insulating components (modules, rail);

eliminating existing umbrella components in an aircraft structure by virtue of the sealtight solution with connection modules, which houses the electrical terminations in a sealtight manner;

the lack of a risk of loss of components (FOD—foreign object damage), since the solution according to the invention does not have any detachable components;

connection and disconnection are possible when current is present;

great modularity that is easily able to adapt to various cable diameters and various wiring configurations.

Numerous applications are contemplated for a terminal block according to the invention, among which mention may be made of wiring of civilian aircraft.

DETAILED DESCRIPTION

Figure 1:
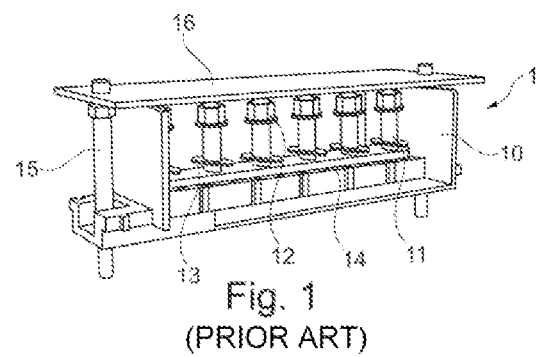
FIG. 1 shows a perspective view of one example of a screwed terminal block according to the prior art, used for electrical wiring in aircraft structures.

Throughout the present application, the terms "vertical", "lower", "upper", "bottom", "top", "below" and "above" should be understood with reference to a terminal block according to the invention with an electrical connection module in a configuration fastened to a horizontally arranged support rail.

Likewise, the terms "internal" and "external" should be understood with reference to an electrical connection module body according to the invention.

For the sake of clarity, one and the same reference numeral is used for one and the same element of an electric cable according to the prior art and an electric cable according to the invention.

Figure 2:
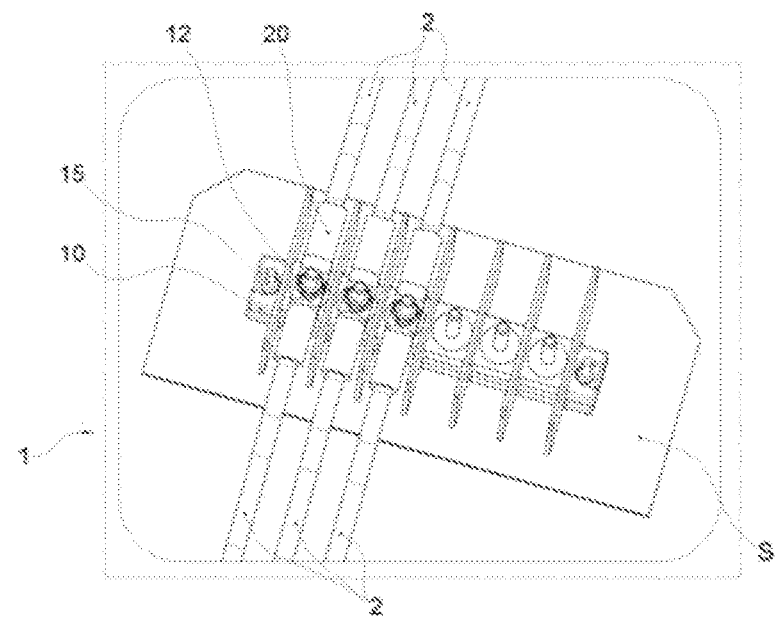
FIG. 2 is another perspective view of a screwed terminal block according to the prior art, showing cable harnesses having lugs connected in the terminal block.

FIGS. 1 and 2 have already been described in detail in the preamble. They will therefore not be commented upon below.

Figure 3:
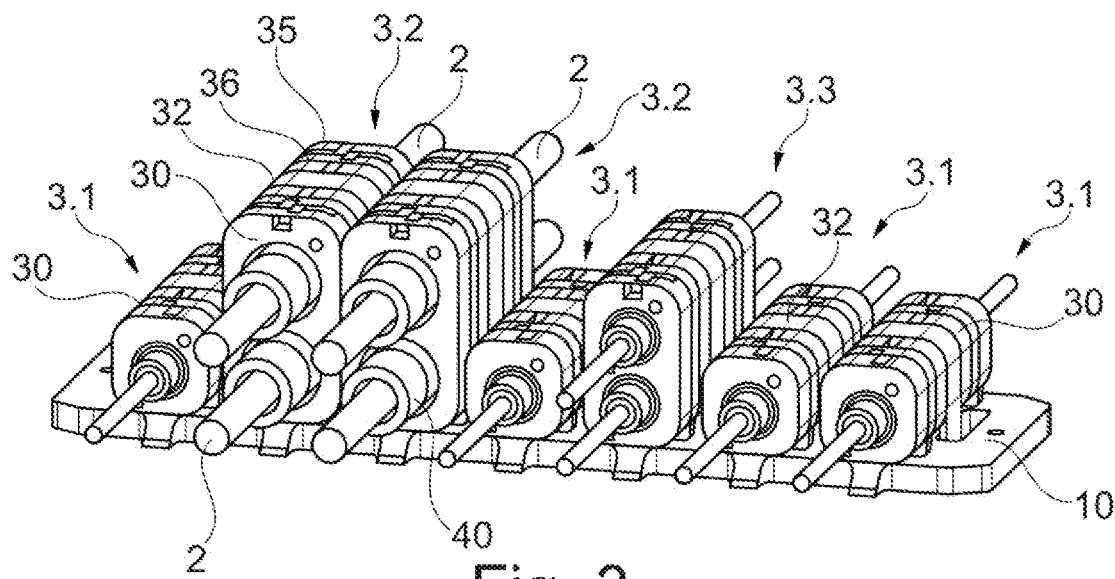
FIG. 3 is a perspective view of a terminal block according to the invention with different connection modules of different sizes fastened and locked to an electrically insulating rail.

FIG. 3 shows one example of a terminal block according to the invention, denoted overall by the reference 1.

This terminal block 1 comprises a plurality of electrical connection modules 3, 3.1, 3.2, 3.3 with an electrically insulating body 30 with a longitudinal axis X, the modules being fastened and locked individually to a support rail 10. This rail may be made of an electrically insulating material, but may also be made of an electrically conductive material in order to create a common ground or for reasons of protecting against electromagnetic interference. Each electrical connection module 3, 3.1, 3.2, 3.3 is intended to house, lock and connect electric cable terminations 4 to one another.

As illustrated, the modules are of different sizes with a different number of cavities for receiving electric cable terminations 4 of different sizes.

More precisely, the electrical connection modules 3.1 comprise a body 30 with a single row of two cavities 31 facing one another, each cavity 31 being of a first size.

The electrical connection modules 3.2 comprise a body 30 with two rows of two cavities 31 facing one another, each of the two cavities 31 facing one another, each cavity 31 being of a second size.

The electrical connection modules 3.3 comprise a body 30 with two rows of two cavities 31 facing one another, each of the two cavities 31 facing one another, each cavity 31 being of the same first size as the cavities 31 of the modules 3.1.

Figure 4:
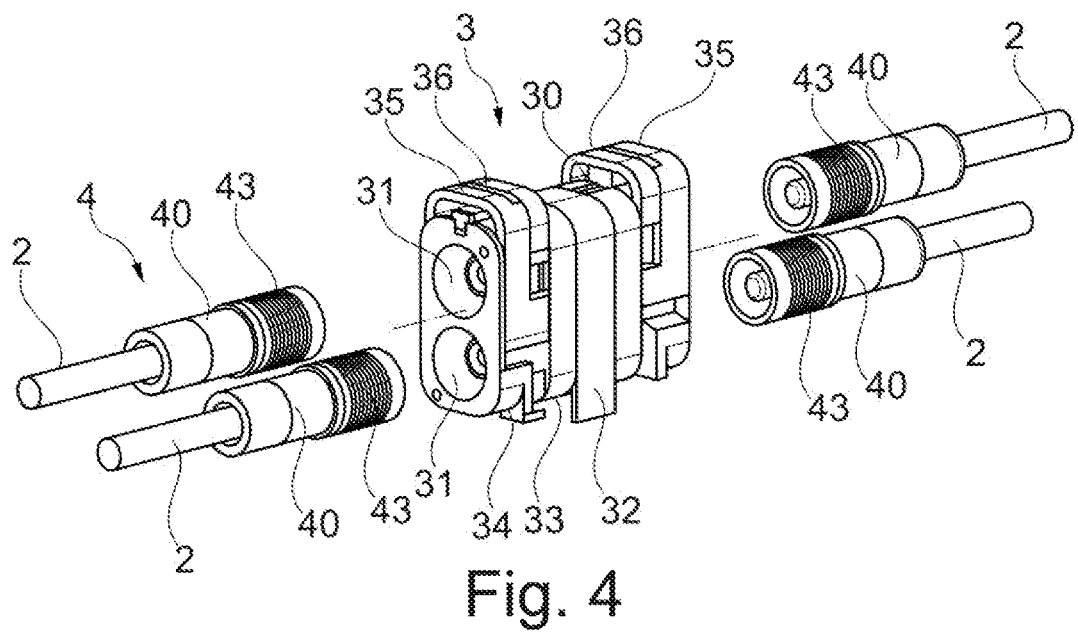
FIG. 4 is a perspective view of a connection module according to the invention with two rows of two cavities with electric cable terminations ready to be housed and connected inside the module.
Figure 5:
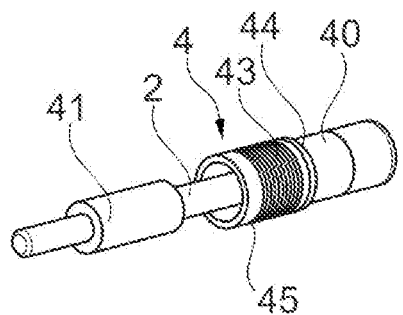
FIG. 5 is a perspective view of an electric cable termination according to the invention before the contact crimped to the cable is inserted into and fastened in the sleeve of the termination.
Figure 6:
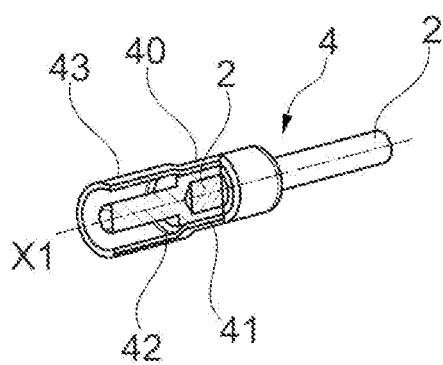
FIG. 6 is a perspective and partly sectional view of an electric cable termination according to the previous figure in the assembled configuration with the contact inserted into and fastened in the sleeve of the termination.
Figure 7:
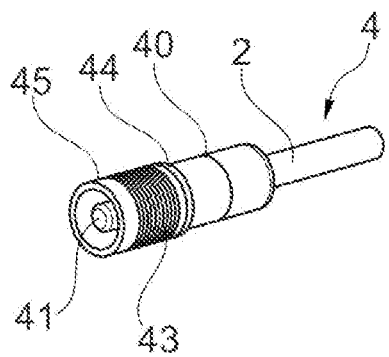
FIG. 7 is a perspective view of an electric cable termination according to the invention in the assembled configuration.

FIG. 4 shows an electrical connection module 3 with two rows above one another of two cavities 31 facing one another, wherein the electric cable terminations 4 are ready to be inserted and locked.

An electric cable termination 4 with a central axis X1 comprises an electrically insulating sleeve 40 and a cylindrical electrical contact 41 crimped to an electric cable 2, inserted and fastened through snap-fastening inside the sleeve 40 by way of a holding clip 42.

The sleeve 40 lastly comprises, on its outer periphery, ridges 43 that extend about the axis X1 over part of the length of the sleeve.

Figure 8:
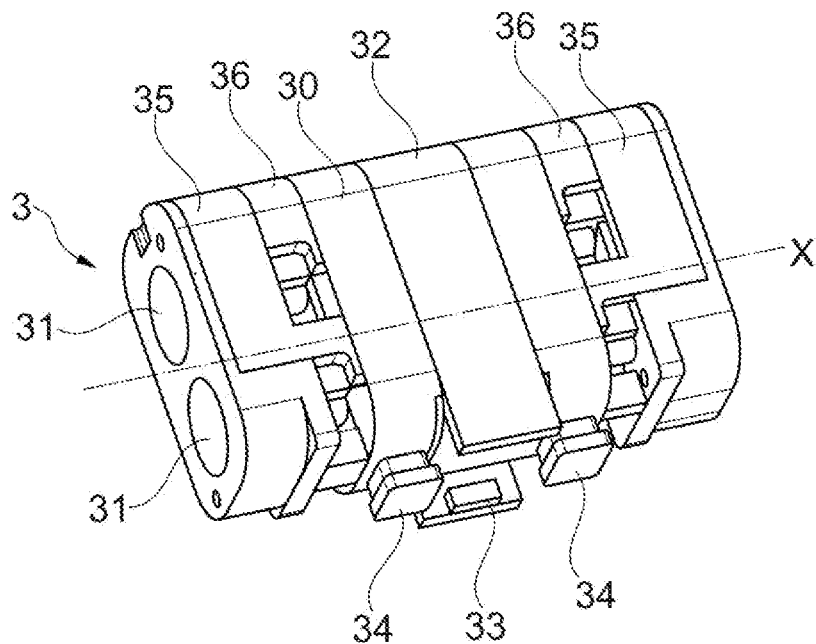
FIG. 8 is a perspective view of a connection module according to the invention.
Figure 9:
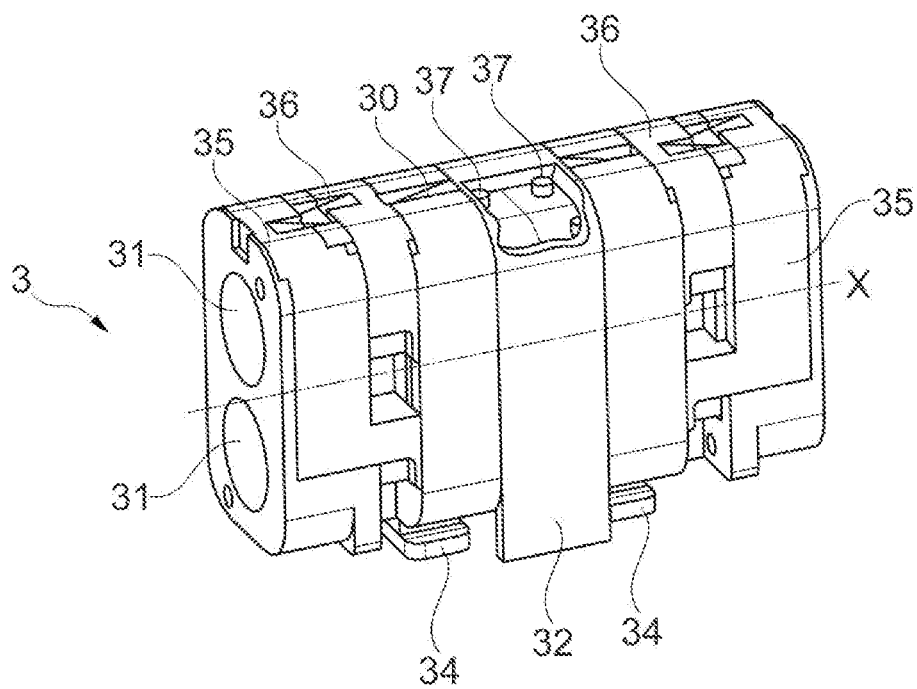
FIG. 9 is another perspective view of a connection module according to the invention.

The outside of an electrical connection module 3 according to the invention is illustrated only in FIGS. 8 and 9.

The body 30 of a connection module 3 internally comprises at least one row of two cavities 31 of the same size, facing one another, intended to electrically connect two electric cable terminations 4 to one another, as explained below.

A first locking plate 32 in the general shape of a U is mounted so as to slide over the central part of the body 30 in a direction transverse to the axis X of the module 3. As described below, this first locking plate 32 is intended to lock the module 3 to the support rail 10 by way of hooking projections 33 formed individually inside each branch of the U.

Positioning pieces 34 project from the bottom of the body 30. As illustrated, these pieces 34 have a T-shaped general cross section with a widened base in comparison with the part above forming the junction with the bottom of the body 30. In the illustrated embodiments, two pieces 34 at a distance from one another project from the bottom of the body 30. It goes without saying that a single positioning piece 34 or a number greater than 2 thereof may be provided.

Two second locking plates 35 are each mounted so as to slide over an end part of the body 30 in a direction transverse to the axis X of the module 3. As described below, each second locking plate 35 is intended to lock an electric cable termination 4 inside a cavity 31 in the bottom of the body 30, once it has been inserted into said cavity.

Two third locking plates 36 are each mounted so as to slide over an end part of the body 30 inside a plate 35, in a direction transverse to the axis X of the module 3.

As described below, each third locking plate 36 is intended to lock an electric cable termination 4 inside a cavity 31 in the top of the body 30, once it has been inserted into said cavity.

Helical springs 37 are housed between the body 30 and the bottom of the U of the first locking plate 32.

These helical springs 37 serve as means for holding this locking plate 32 in its locking position by returning this locking plate 32 from its unlocking position to its locking position, as described below.

Figure 10A:
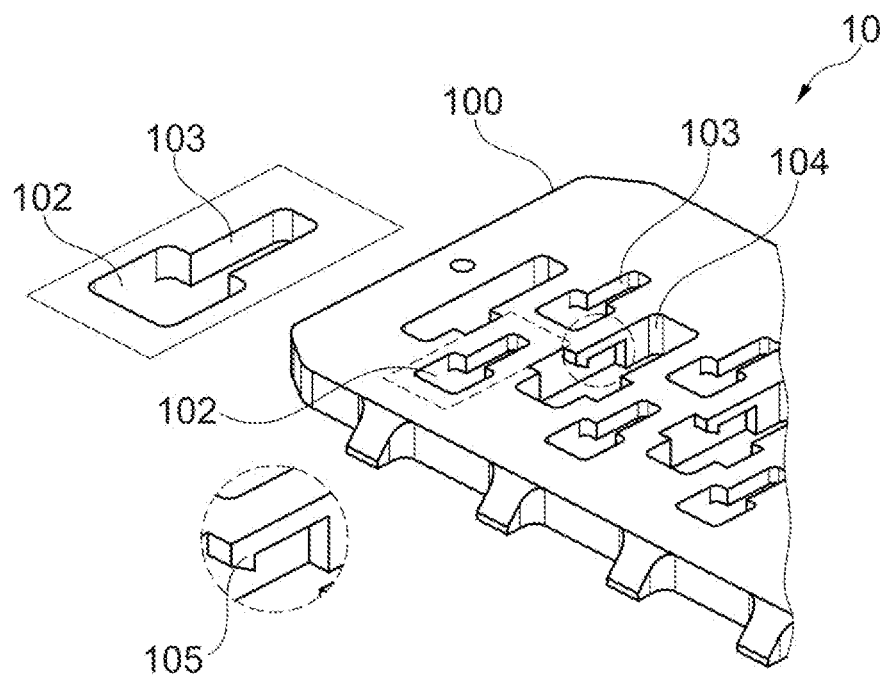
FIG. 10A is a perspective plan view of a support rail according to the invention.
Figure 10B:
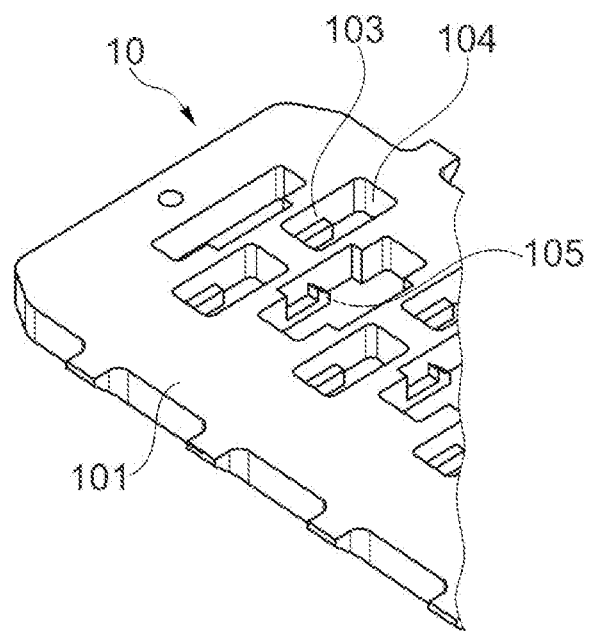
FIG. 10B is a perspective view from below of a support rail according to the invention.

As illustrated in FIGS. 10A and 10B, the support rail 10 comprises a plurality of open grooves between its top face 100 and its bottom face 101.

The open grooves are:
 insertion grooves 102, the cross section of each of which is wider than that of a positioning piece 34 of a connection module 3,
 fastening grooves 103 each in the extension of an insertion groove 102 in the direction of the width of the support rail 10, and the cross section of which is narrower than that of a positioning piece 34 of a connection module 3, with a smaller height, which makes it possible also to block the piece 34 along the axis Z;

locking grooves 104, inside each of which a locking tab 105 is formed.

Each insertion groove 102 is adjacent to a fastening groove 103 in the direction of the width of the rail.

Two insertion and fastening grooves 102 and 103, respectively, that are adjacent in the direction of the width of the support rail 10 are separated in the direction of the width of the support rail 10 by a distance equal to the distance between two positioning pieces 34.

Two non-joined locking half-grooves 104, with a width equal to half the latter in the direction of the length of the rail 10, are separated in the direction of the length of the support rail 10 by a distance equal to the distance between the two projections 33 of the locking plate 32. Two pairs each consisting of an insertion groove 102 and of a fastening groove 103 in the extension are separated in the direction of the length of the rail by a distance equal to the distance between the two positioning pieces 34.

Thus, a complete scheme for inserting, fastening and locking a connection module 3 to the support rail 10 consists of two pairs each consisting of an insertion groove 102 and a fastening groove 103 that are aligned, and of two non-joined locking half-grooves 104 that are separated by the abovementioned two pairs.

The method for fastening and locking a connection module 3 to a support rail 10 according to the invention is now described with reference to FIGS. 11A to 11F.

Figure 11A:
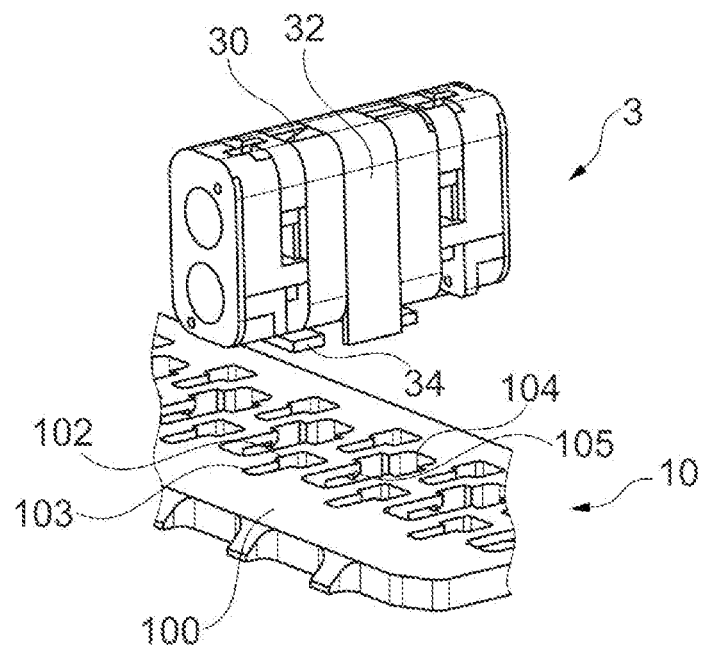
FIG. 11A is a perspective view showing a first step of inserting, fastening and locking a connection module to a support rail.

Step a/: the operator brings a connection module 3 flush with the support rail 10 by placing each positioning piece 34 so as to face an insertion groove 102 (FIG. 11A).

Figure 11B:
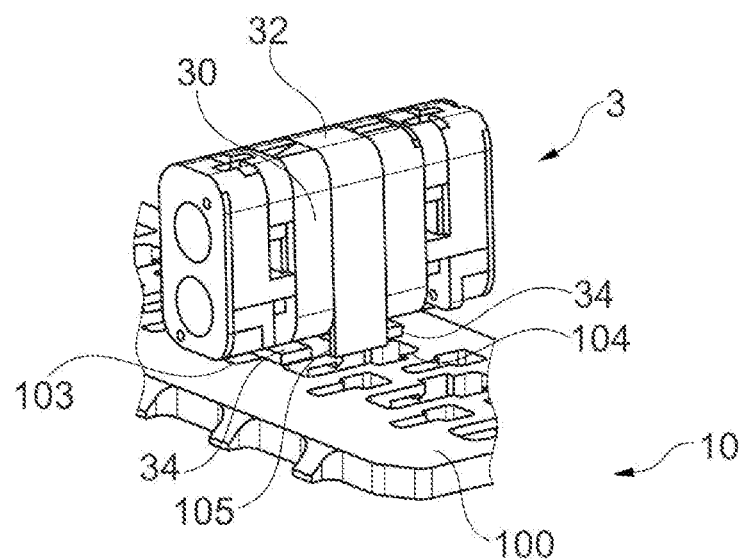
FIG. 11B is a perspective view showing a second step of inserting, fastening and locking a connection module to a support rail.

Step b/: the operator then centres and inserts each positioning piece 34 into an insertion groove 102 (FIG. 11B).

Once the insertion has finished, the bottom of the connection module 3 abuts on the top face 100 of the rail 10.

Figure 11C:
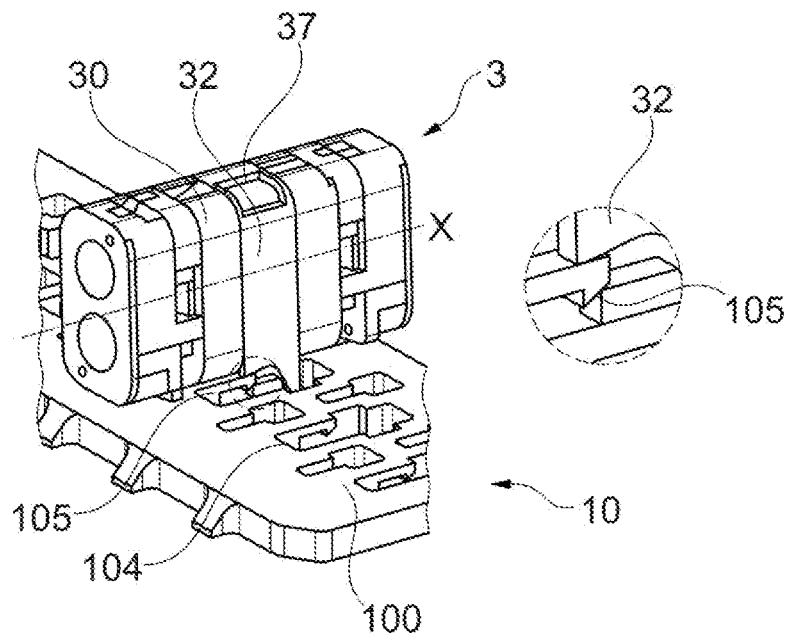
FIG. 11C is a perspective and partially extracted view showing a third step of inserting, fastening and locking a connection module to a support rail.

Step c/: the operator then moves the connection module 3 in translation along its longitudinal axis X, thereby causing each positioning piece 34 to move in translation into a fastening groove 103 (FIG. 11C).

Figure 11D:
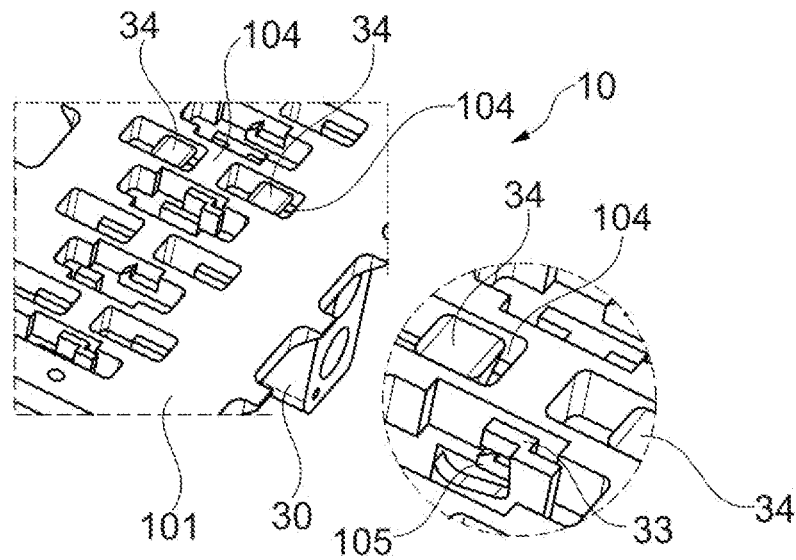
FIG. 11D is a perspective and partially extracted view showing a fourth step of inserting, fastening and locking a connection module to a support rail.

This translational movement simultaneously creates mechanical contact between at least one of the branches of the U of the locking plate 32, which then slides over the locking tab 105 (FIGS. 11C, 11D). More precisely, the locking projection 33 slides over the bottom of the tab 105 (FIG. 11D).

Figure 11E:
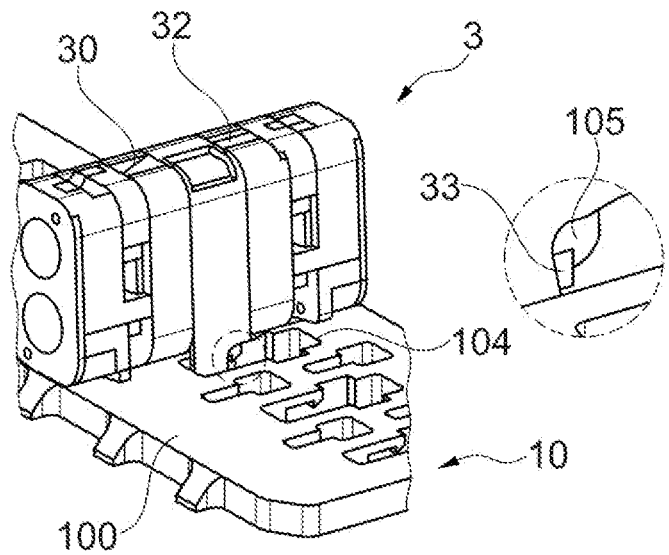
FIG. 11E is a perspective and partially extracted view showing a fifth step of inserting, fastening and locking a connection module to a support rail.
Figure 11F:
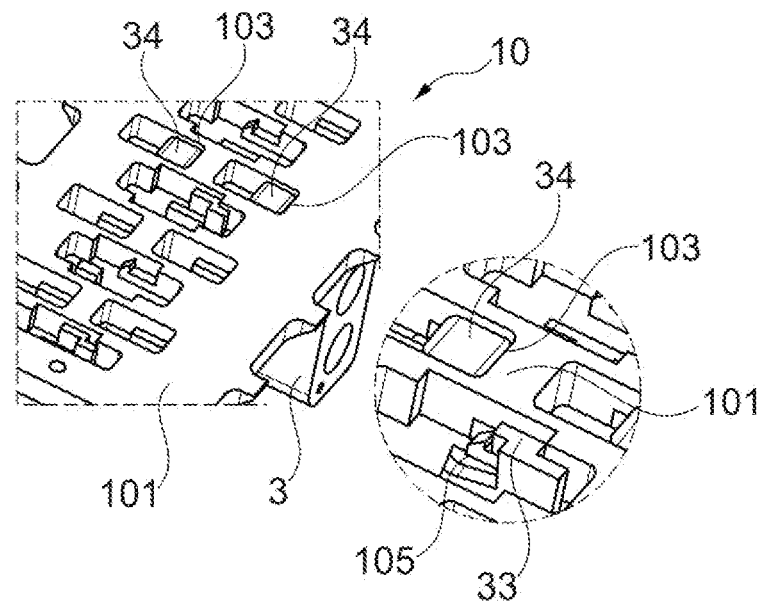
FIG. 11F is a perspective and partially extracted view showing a sixth step of inserting, fastening and locking a connection module to a support rail.

Step d/: the translational movement is continued until at least one positioning piece 34 abuts against the bottom of the fastening groove 103 (FIGS. 11E, 11F). In this position, the locking plate 32 returns to the top position by virtue of the return force of the helical spring or springs 37.

The plate 32, and hence the connection module 3, are then locked to the support rail 10 by way of each tab 105, which hooks onto a locking projection 33 (FIGS. 11E, 11F).

Figure 12:
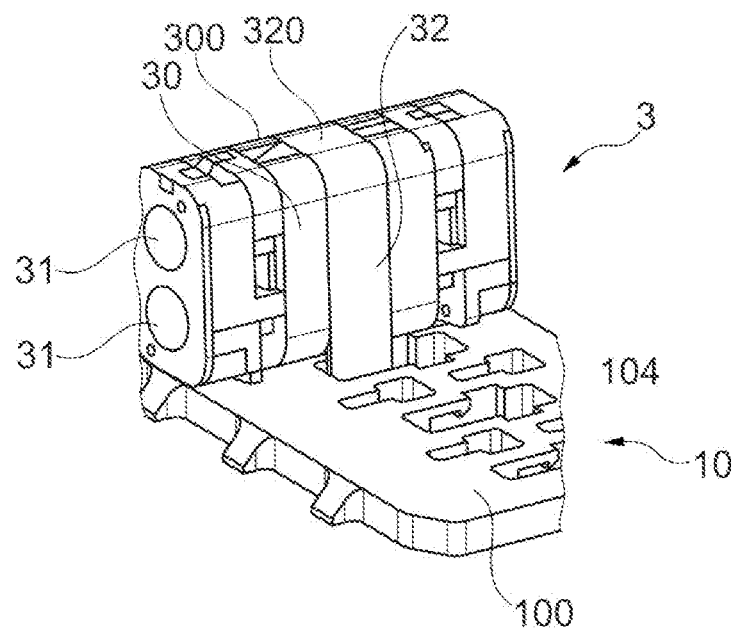
FIG. 12 is a perspective view of a terminal block according to the invention with a connection module fastened and locked to a support rail.

FIG. 12 shows the connection module 3 in a position fastened and locked to the support rail 10. One advantageous configuration may consist in giving a visual indicator to the operator so that the is able to quickly check that the fastening and the locking have been performed correctly.

As may be seen in this FIG. 12, this visual indicator consists in configuring the various fastening and locking elements such that, in the fastened and locked position, the top face 320 of the locking plate 32 is approximately in the same plane as the top face 300 of the body 30.

Figure 13:
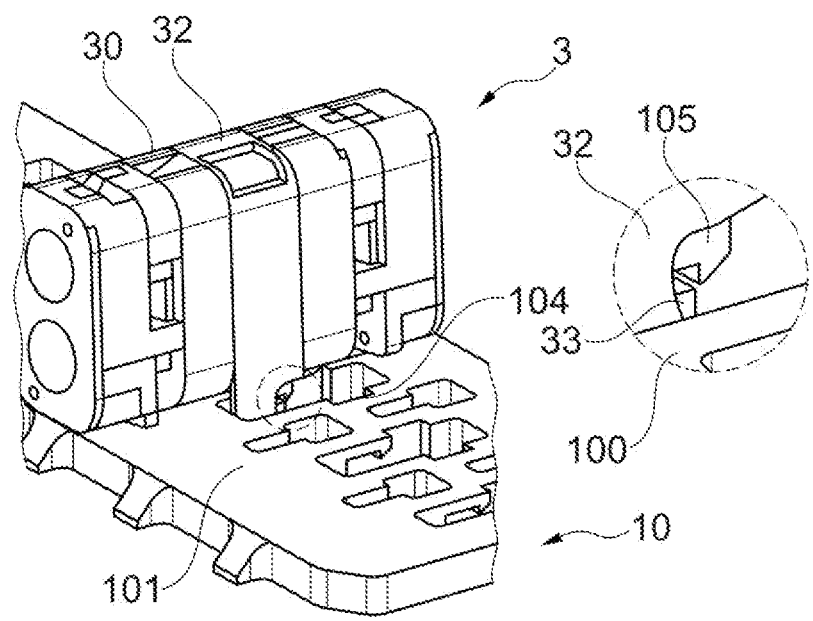
FIG. 13 is a perspective view showing the step of unlocking and removing the connection module from the support rail according to the invention.

If it is necessary to disassemble the connection module 3, that is to say to unlock it and remove it from the support rail 10, the operator proceeds as follows:

Step e/: the operator presses the plate 32 downwards, thereby disengaging the projection 33 from the locking tab 105 and thereby unlocking the connection module 3 from the rail (FIG. 13).

Step f/: the operator may then move the connection module 3 in translation in the direction opposite to that in steps c/ and d/, until each piece 34 reaches the insertion groove 102 and is thus able to be disengaged therefrom. The module 3 may then be removed by moving it away from the rail 10, that is to say by moving it upwards.

A description is now given of the assembly with the locking of electric cable terminations 4 inside a connection module 3 according to the invention.

Figure 14:
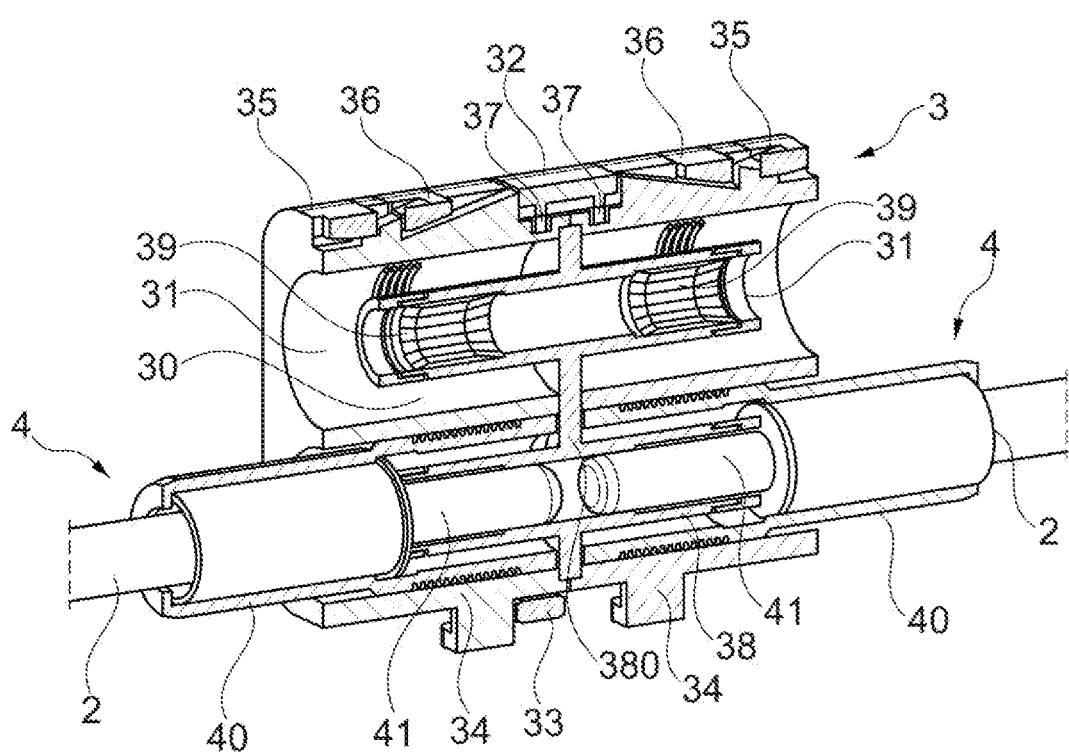
FIG. 14 illustrates a perspective and longitudinal sectional view of one embodiment of a connection module with two rows of cavities above one another and electrically connected to one another by an electric shunt internal to the module.

As illustrated in FIG. 14, in order to create the electrical connection between two contacts 40 of two independent cable terminations 4 inside the body 30 of a module 3, an electrically conductive component 38 in the form of a tube is fastened inside the body 30.

This conductive tube 38 thus comprises two cavities into each of which an electrical contact 41 is able to be inserted with mechanical contact on its outer periphery. The electrical continuity between the electric cable 2 of a termination 4 and the conductive tube 38 is thus created by this contact with the contact 41.

The conductive tube 38 may be equipped with at least one electrical continuity wall 380 inside the body 30, also called electric shunt, which creates electrical continuity between at least two rows of cavities 31 above one another and into which at least four contacts 41, all of which it is desired to electrically connect to one another, are inserted.

In other words, the conductive tube 38 with at least one shunt 380 makes it possible to electrically interconnect contacts 41 that are inserted into cavities 31 in the body 30 on different rows.

Figure 15:
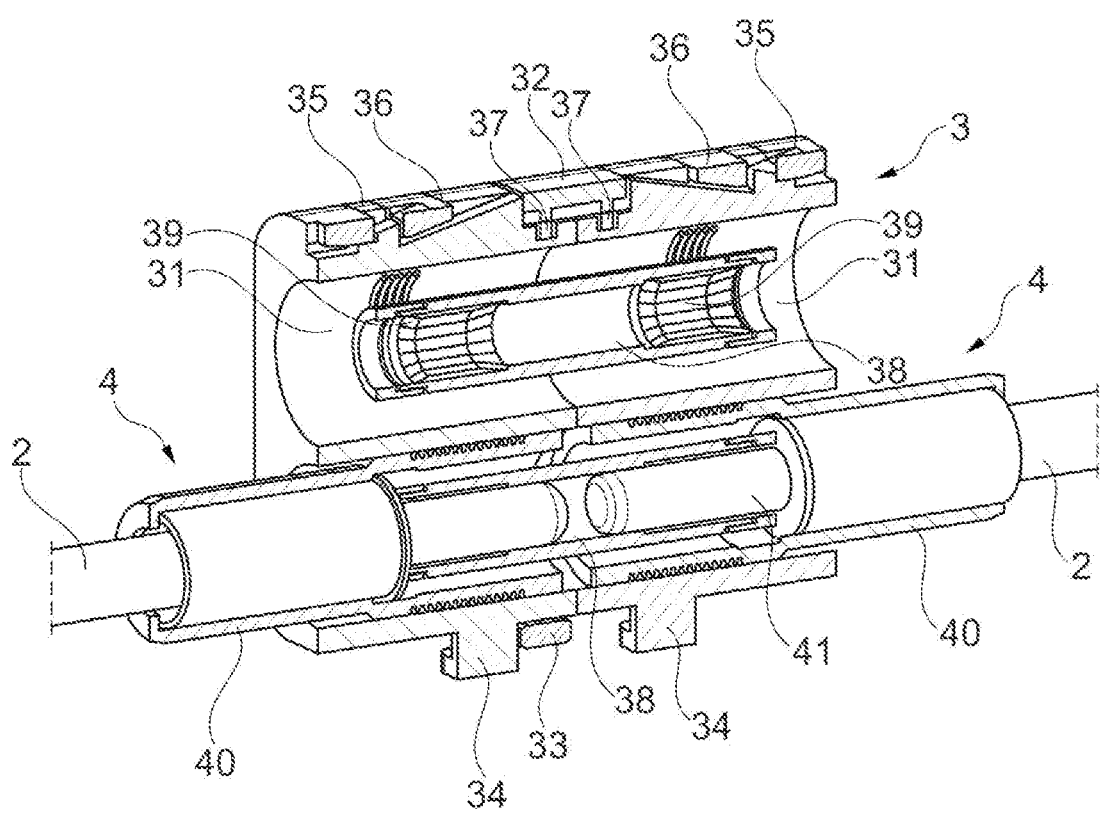
FIG. 15 illustrates a perspective and longitudinal sectional view of one embodiment of a connection module with two rows of cavities above one another but, unlike the previous figure, without an electric shunt internal to the module.

It goes without saying that it is possible to contemplate an electrically conductive tube 38 without an electrical continuity wall 380 and thus to have cavities in the conductive tube on one row that are not electrically connected to the other row below or above. In other words, it is possible to provide an electrically conductive tube 38 that makes it possible to electrically connect only two terminations 4 that are inserted, facing one another, into the body 30. This configuration is shown in FIG. 15.

By contrast, it is also possible to contemplate an electrically conductive tube with an electrical wall that makes it possible to electrically interconnect only two terminations 4 that are inserted, above one another, into the body 30.

In order to improve the electrical continuity between a terminal 4 contact 41 and the cavity of a conductive tube 38, it is possible to arrange a flexible electrical multi-contact ring 39 (as in the case of power contacts) inside said conductive tube.

As illustrated in FIG. 14, the terminations 4 and the cavities in the conductive tube are sized such that, in their extreme inserted position, that is to say when the sleeves 40 are in longitudinal abutment against the conductive tube 38, the electrical contacts 41 inserted facing one another are not able to be in mechanical contact.

According to the invention, there is advantageously provision to have a locking plate (latches) 35, 36 for locking a cable termination 4 in a cavity 31 that is independent of all of the others for the same module 3.

Thus, in the illustrated examples, a cable termination 4 may be locked in each cavity 31 from the bottom by a locking plate 35 that slides around one of the lateral parts of the body 30, whereas a cable termination 4 may be locked in each cavity 31 from the top by a locking plate 36 that also slides around one of the lateral parts of the body 30 but between a locking plate 35 and the locking plate 32 for locking the module 3 to a rail 10.

The positions of the latches 35 and 36 on the module 3 may be swapped.

The method for assembling, that is to say fastening and locking, two cable terminations 4 by way of two independent latches 35, 36 in one and the same connection module 3 is now described with reference to FIGS. 16A and 17.

Figure 16A:
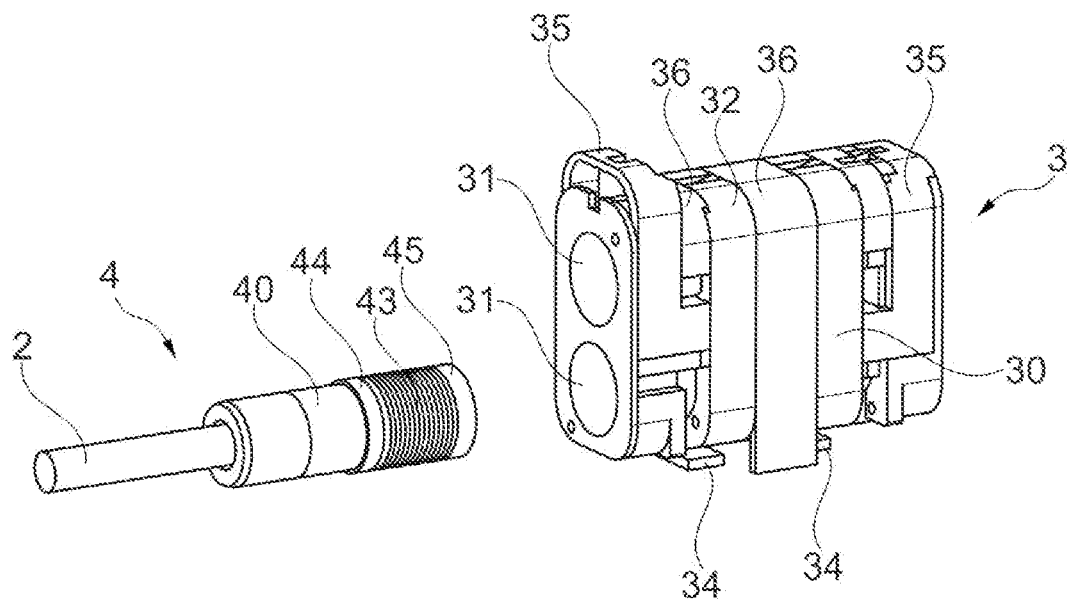
FIG. 16A illustrates, in a perspective view, a first stage of an electric wiring termination approaching a cavity of a connection module according to FIG. 14.

Step i/: the operator slides one of the sliding latches 35 upwards in order thus to bring it into its upper unlocking position (FIG. 16A).

Step ii/: the operator then inserts a cable termination 4 into a cavity 31 from the bottom with its contact 41 inserted, in contact with a flexible ring 39, into the cavity of the conductive tube 38, clear from the latch 35 in the upper position (FIG. 16A).

Figure 16B:
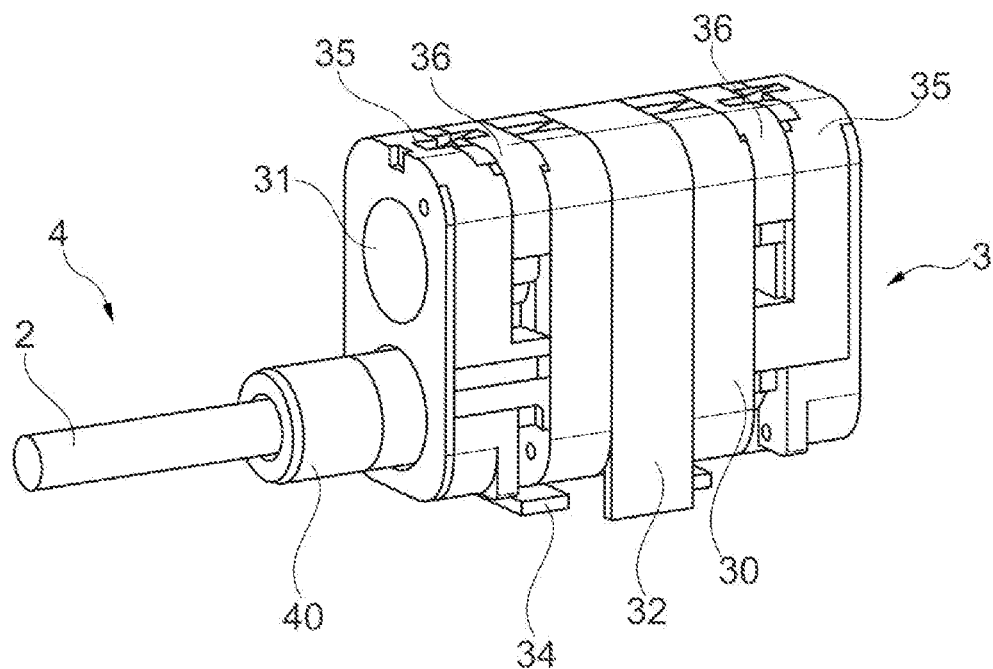
FIG. 16B illustrates, in a perspective view, a second stage of an electric wiring termination being inserted into and locked in a cavity of a connection module according to FIG. 14.

Step iii:/ once step ii/ is finished, the operator moves the latch 35 in translation from its upper unlocking position into its lower locking position, in which it blocks the cable termination 4 in translation in the cavity 31 into which it is inserted (FIG. 16B).

Figure 17:
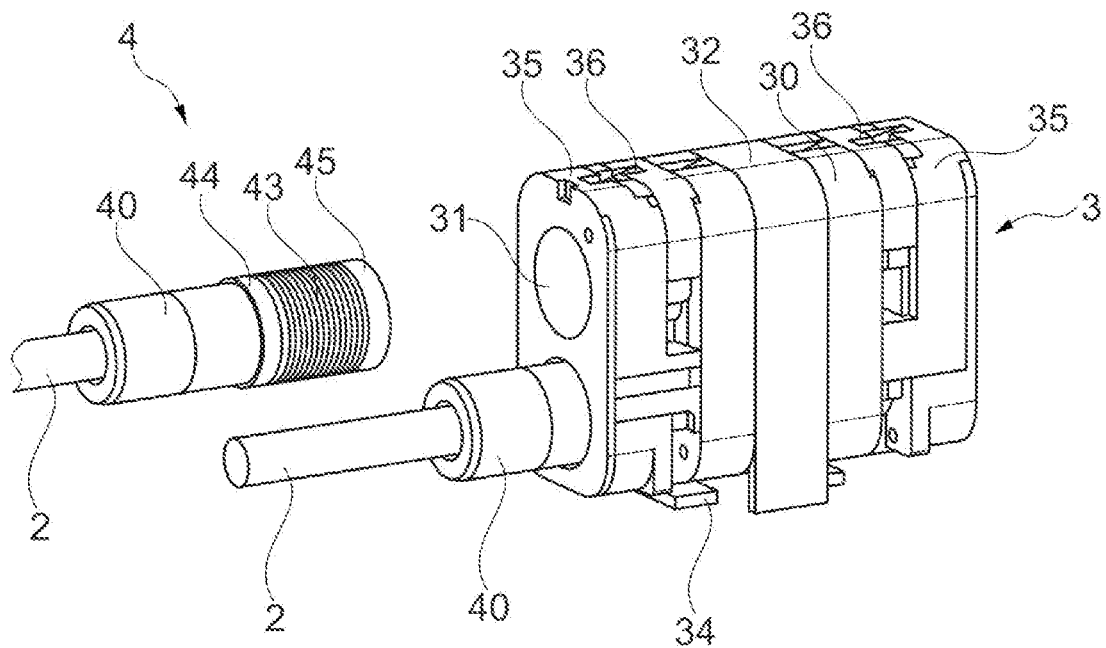
FIG. 17 illustrates, in a perspective view, another electric wiring termination approaching another cavity of a connection module according to FIG. 14 before being inserted and locked.

Step j/: the operator slides one of the sliding latches 36 upwards in order thus to bring it into its upper unlocking position (FIG. 17).

Step jj/: the operator then inserts a cable termination 4 into a cavity 31 from the top with its contact 41 inserted, in contact with a flexible ring 39, into the cavity of the conductive tube 38, clear from the latch 36 in the upper position (FIG. 17).

Step jjj:/ once step jj/ is finished, the operator moves the latch 36 in translation from its upper unlocking position into its lower locking position, in which it blocks the cable termination 4 in translation in the cavity 31 into which it is inserted.

Since the operation of the sliding latches 35, 36 is completely independent of one another, the operator is able to perform steps i/ to iii/ before steps j/ to jjj/ or in a reverse order, that is to say steps j/ to jjj/ first.

Figure 18:
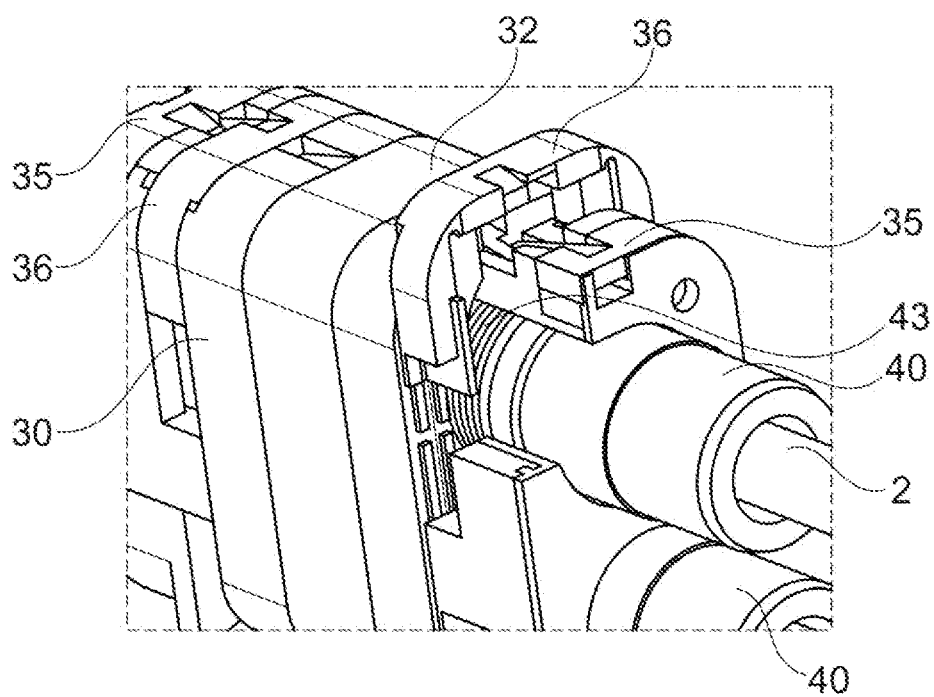
FIG. 18 is a perspective and partly sectional view showing a U-shaped locking plate before it slides so as to lock an electrical wiring termination in a connection module according to FIG. 14.
Figure 19:
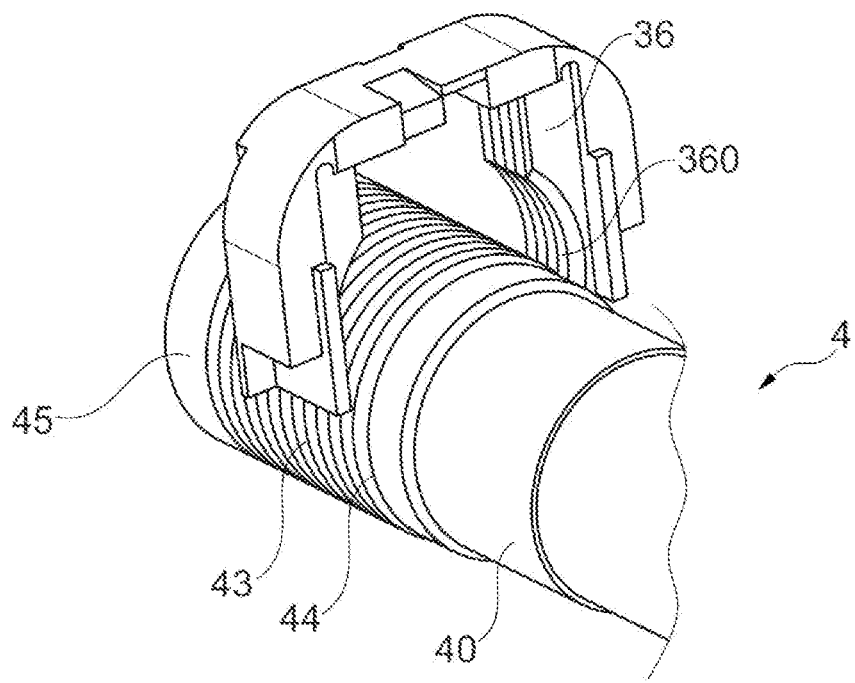
FIG. 19 is a perspective view showing a U-shaped locking plate immediately before it slides so as to lock an electrical wiring termination.
Figure 20:
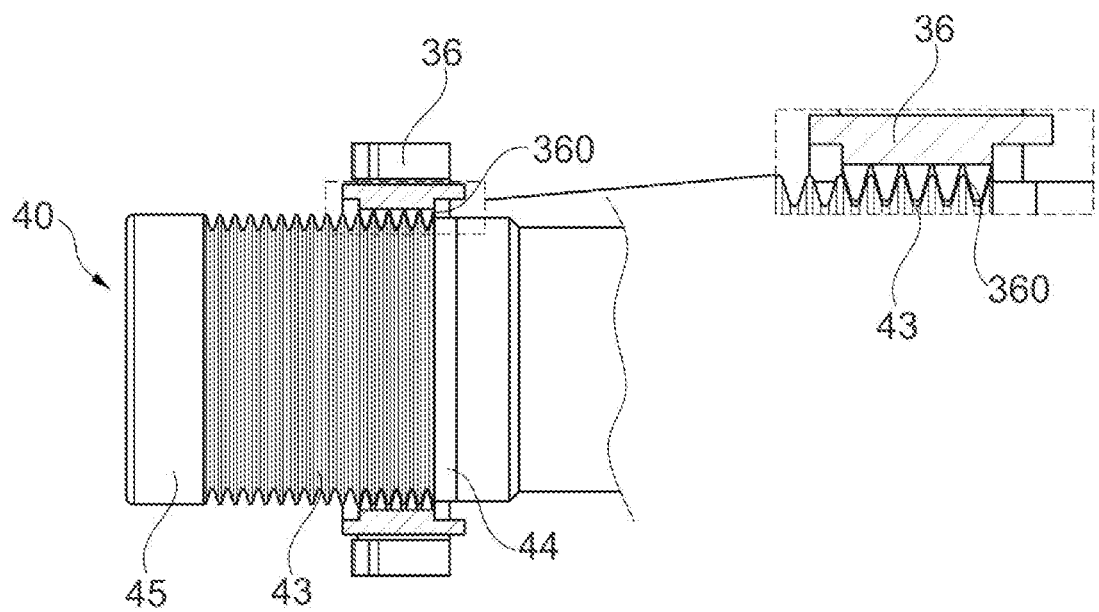
FIG. 20 is a partly sectional and detailed view from below showing the locking of an electrical wiring termination by way of a U-shaped locking plate.

FIGS. 18 to 20 show one advantageous method of locking a cable termination 4 in detail, performed by way of a sliding latch 36 that has just been described. This embodiment is advantageously identical for the sliding latch 35.

When the latch 36 is slid downwards, the ridges 360 formed inside the sliding latch 36 are inserted into the complementary ridges 43 on the outer periphery of the sleeve 40, thereby thus locking, that is to say blocking in translation, the termination 4 in the connection module 3.

In this locking position, the ridges 360 of the latch 36 are therefore interleaved between the ridges 43 of the sleeve 40.

This locking method makes it possible to define a device for compensating for a shortage of length or an excess length of cable 2.

Specifically, depending on the installation conditions in a structure in which a terminal block 1 according to the invention is intended to be fastened, the cables 2 to the end of which the terminations are fastened may have longer or shorter lengths, which may differ by an initially defined nominal length.

By creating ridges 43 over a large part of the length of sleeve 40, blocking by way of complementary ridges 360 makes it possible to compensate for the excess length or shortage of length of the cable 2 by inserting the termination 4 over a longer or shorter length.

Figure 21:
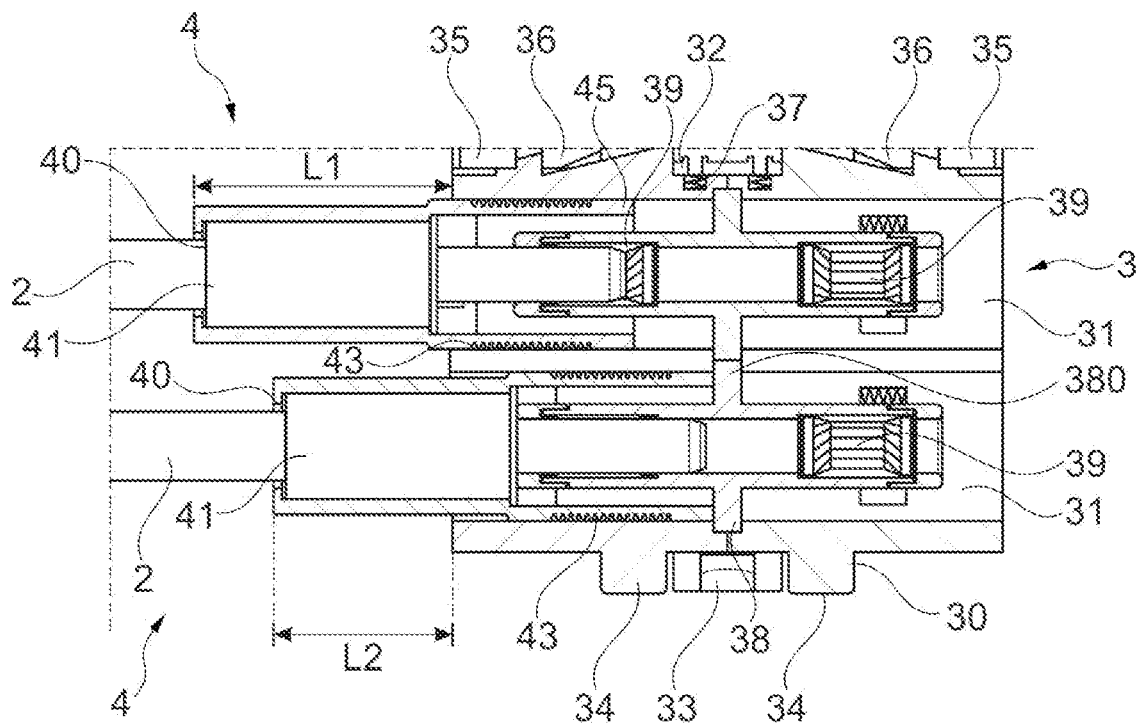
FIG. 21 is a longitudinal sectional view showing the locking of two electrical wiring terminations in a connection module according to FIG. 14, the terminations being locked with different inserted lengths.
Figure 22:
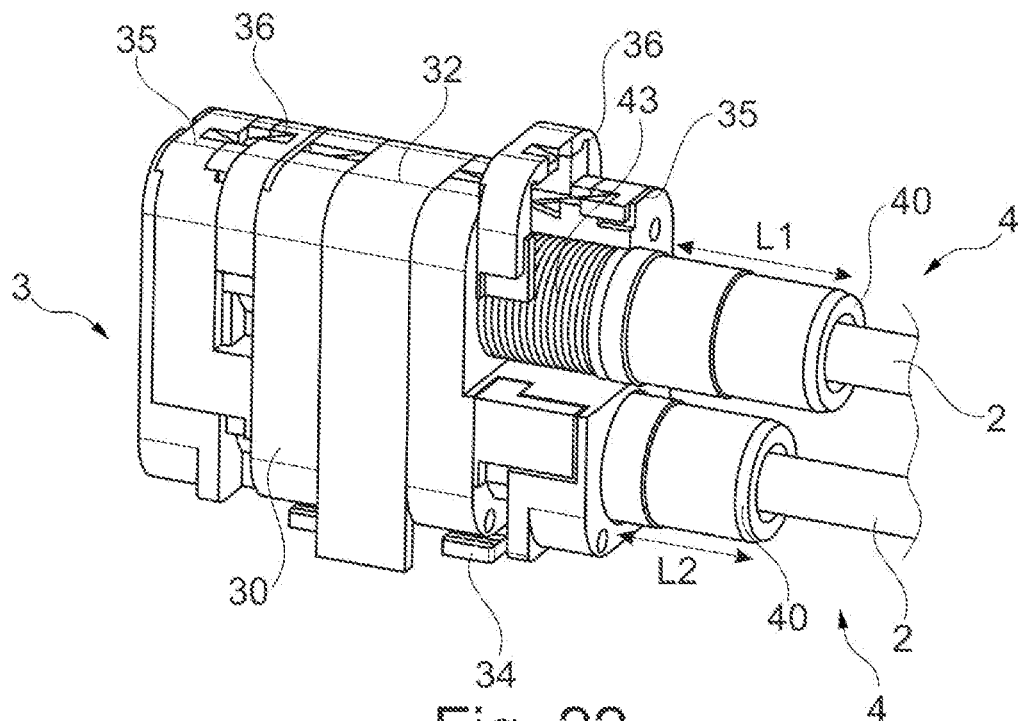
FIG. 22 is a perspective and partly sectional view showing a U-shaped locking plate before it slides so as to lock an electrical wiring termination in a connection module according to FIG. 14.

FIGS. 21 and 22 illustrate this way of compensating for the shortage of length or excess length of a cable 2 between two possible extreme positions L1 and L2.

The termination 4 at the top is in a first extreme minimally inserted position in which locking thereof in the cavity 31 at the top begins to be possible, since the ridges 360 of the latch are able to be interleaved between the first ridges 43 of the sleeve. In this first extreme position, the sleeve 40 projects by a distance L1 outside the connection module 3.

The termination 4 at the bottom is in a second extreme maximally inserted position in which its contact 41 is in longitudinal abutment against the conductive tube 38. In this second extreme position, the sleeve 40 projects by a distance L2 outside the connection module 3. The latch 36 is thus able to lock a cable termination 4 in translation in any one of its positions inserted between the first and the second extreme position. In other words, with locking by way of complementary ridges 43, 360, it is possible to compensate for a length of cable 2 substantially equal to L1−L2.

According to the invention, it is advantageous to provide means aimed at guaranteeing to the operator that a cable termination 4 has been inserted correctly.

Figure 23:
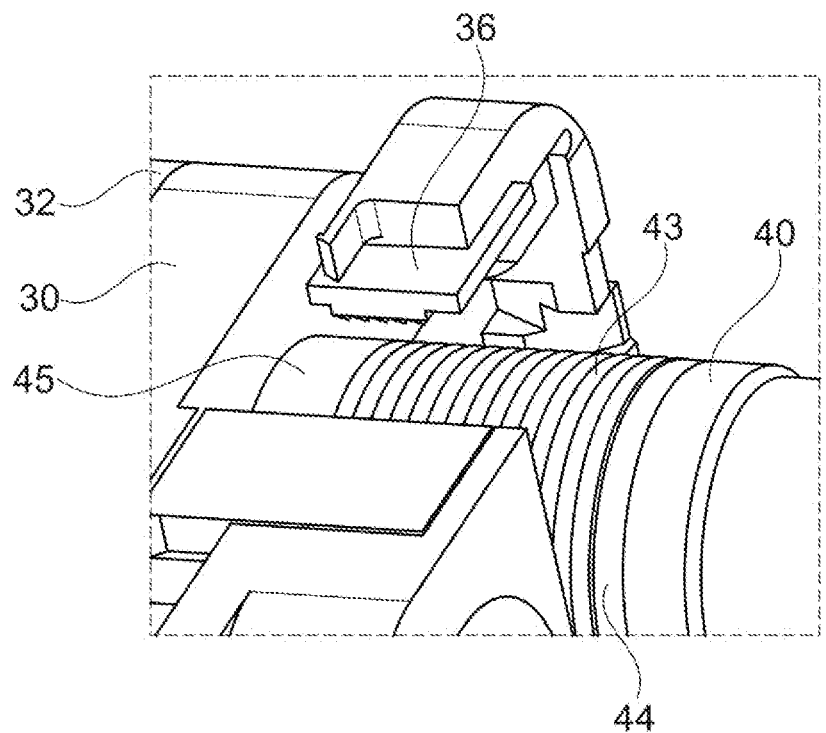
FIG. 23 is a detailed perspective view of FIG. 22.

In fact, if the sleeve 40 is inserted in the first extreme position and beyond this towards the outside of the module, then the ridges 360 of the latch 36 bear against a cylinder 45, that is to say an area without a ridge 45 and formed at the free end of this sleeve 40 (FIG. 23).

One or more in particular coloured identification markers 44, 361 allow(s) the operator to quickly identify whether the sleeve 40 has been correctly inserted into and locked in the connection module 3.

These identification markers may consist of a coloured ring 44 behind the ridges 43 on the outer periphery of the sleeve 40 and/or of one or more localized markers 361 of the same colour on the edge of the sliding latch 36.

Figure 24:
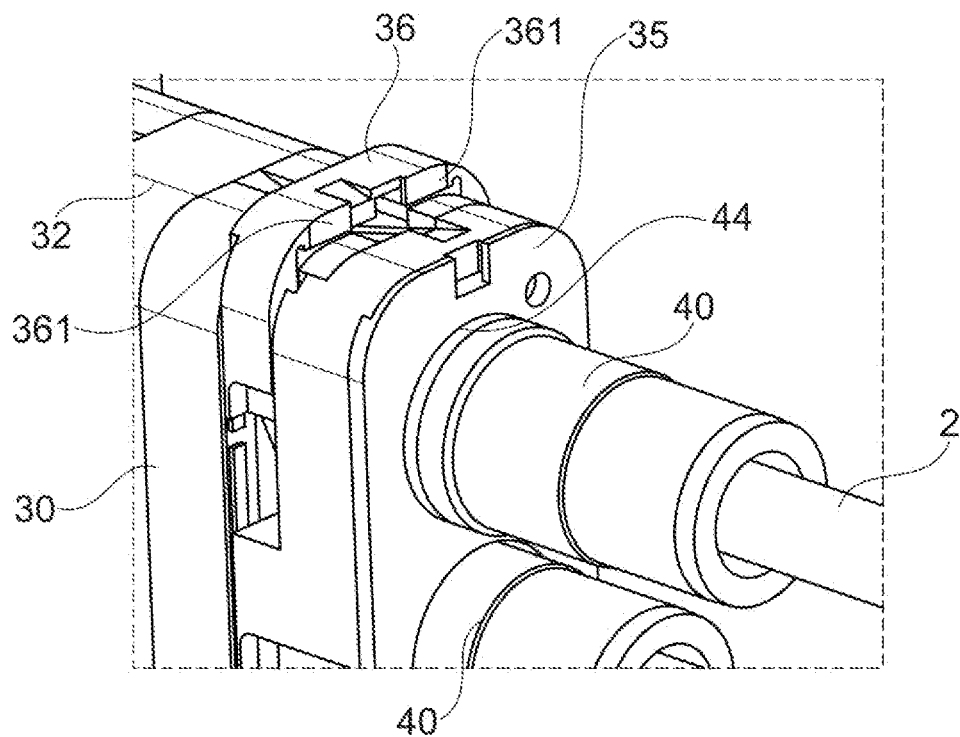
FIG. 24 is a perspective view of the outside of a configuration according to FIG. 22.

Thus, if the sleeve 40 is not inserted sufficiently into the connection module 3, one and/or the other of these coloured markers 44, 361 remain(s) visible after insertion, and this is reflected mechanically by it being impossible to lock the termination 4 using the sliding latch 36 (FIG. 24).

Figure 25:
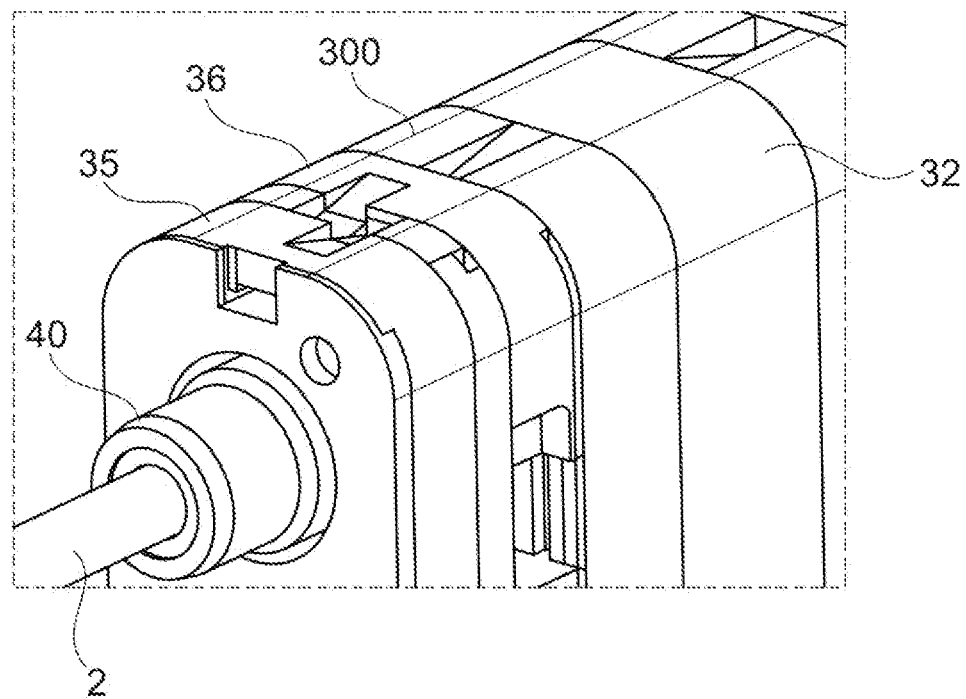
FIG. 25 is a perspective view showing the finalized locking of an electrical wiring termination in a connection module according to FIG. 14.

By contrast, if the sleeve 40 is inserted correctly into the connection module 3, one and/or the other of these coloured markers 44, 361 are no longer visible after insertion, and this is reflected mechanically by it being possible to lock the termination 4 using the sliding latch 36 (FIG. 25).

In the locking position, the upper outer face of the latch 36 is preferably in the same plane as or set back slightly from the upper outer face 300 of the module 3. The same applies to the sliding latch 35.

Figure 26:
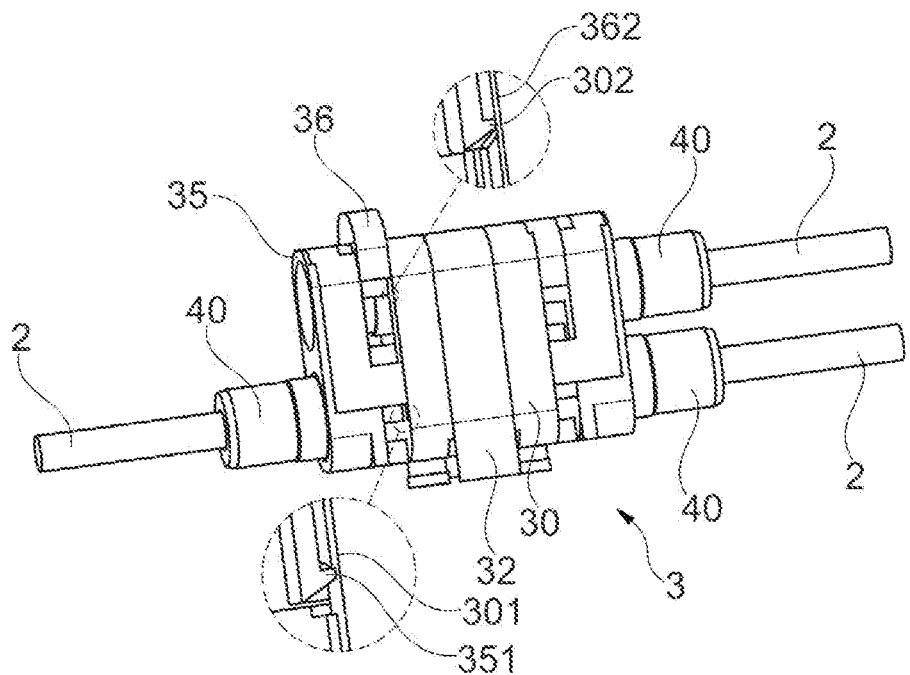
FIG. 26 is a perspective and detailed view showing the means for locking the U-shaped locking plate before it slides so as to lock an electrical wiring termination in a connection module according to FIG. 14.

FIG. 26 illustrates one advantageous variant for keeping each of the sliding latches 35, 36 in their locking and unlocking positions.

Tabs 351, 362 formed at the end of each of the latches 35, 36, advantageously at the end of each branch when the latches 35, 36 are in the general shape of a U, thus hook respectively into recesses 301, 302 provided for this purpose when the latches 35, 36 are in their unlocking or locking position.

According to another embodiment, there may be provision to block all or some of the components of a cable termination 4 in rotation when it is inserted into a connection module 3.

Figure 27:
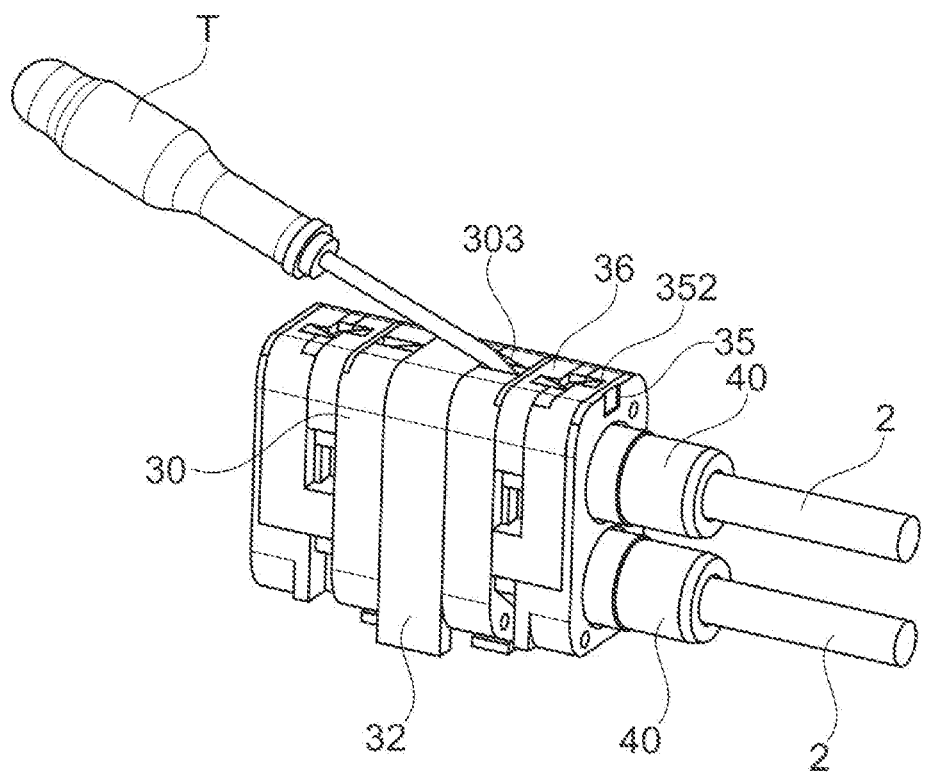
FIG. 27 is a perspective view showing the unlocking, by way of a screwdriver, of an electrical wiring termination from a connection module according to FIG. 14.
Figure 28:
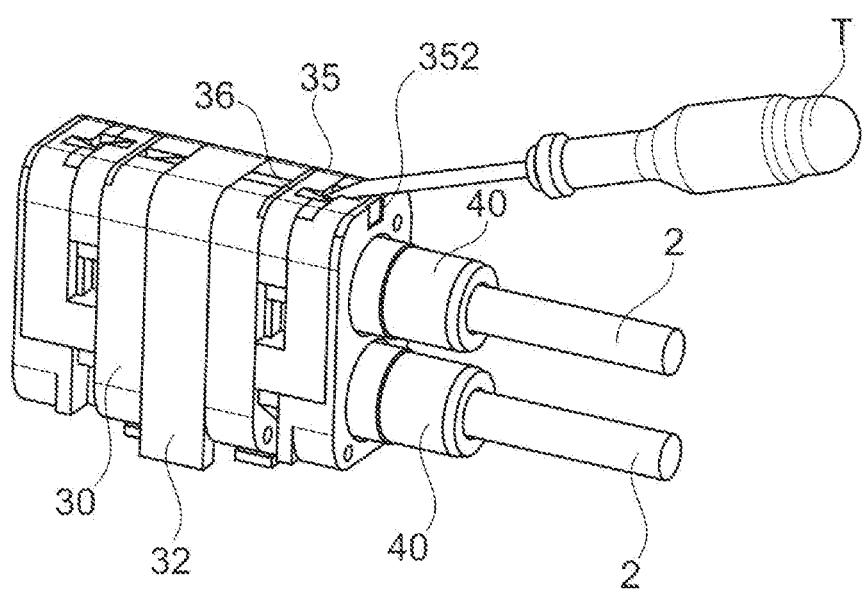
FIG. 28 is another perspective view showing the unlocking, by way of a screwdriver, of an electrical wiring termination from a connection module according to FIG. 14.

FIGS. 27 and 28 illustrate one method of unlocking the sliding latches 36 in which the unlocking, that it to say the upwards movement of a latch 36 from its locking position, may be performed using a standard T screwdriver.

As is apparent from these FIGS. 27 and 28, the tip of the T screwdriver may be inserted into slots 303, 352 provided for this purpose respectively in the body 30 or in the adjacent sliding latch 35. It is thus made easier to remove the sliding latch 35 through the lever effect of the T screwdriver.

Figure 30:
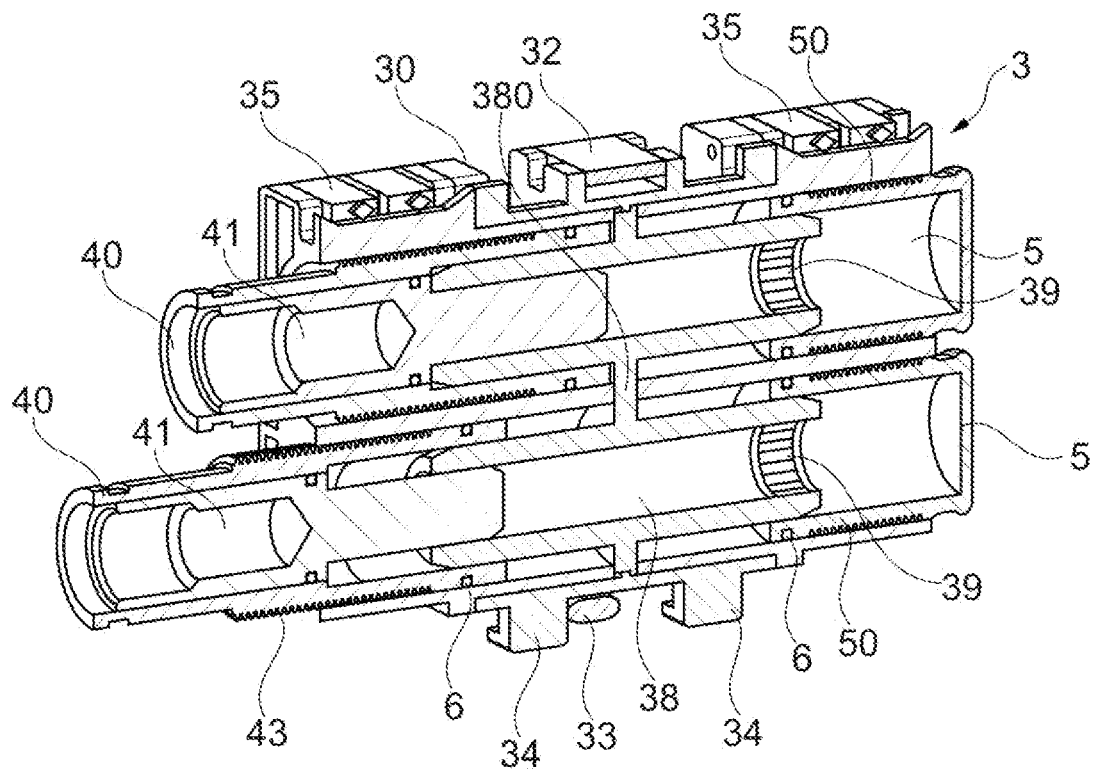
FIG. 30 reproduces FIG. 29, but with the presence of stops in two cavities of the connection module body in order to show the electrical connection between two terminations inserted into the other cavities that are arranged above one another in the body of the module.

This insertion is made all the easier since it is therefore possible from either of the sides of the module 3, thereby facilitating handling for an operator in areas that are difficult to access. FIG. 30 shows an electrical connection between two cable terminations 4 that are inserted into and fastened in cavities 31 in the body 30 that are arranged above one another.

This electrical connection internal to the body 30 is achieved by way of the electrically conductive tube 38 and its shunt connection wall 380 between the two rows of cavities 31 above one another.

In such a configuration, it is advantageously possible to provide, instead of a cable termination 4, the presence of electrically insulating stops 5 each inserted into a cavity 31. Each of these stops 5 may be fastened and locked by a sliding latch 35, 36 whose inner ridges 350, 360 engage with the outer ridges 50 formed for this purpose on the outer periphery of the stops 5.

Figure 29:
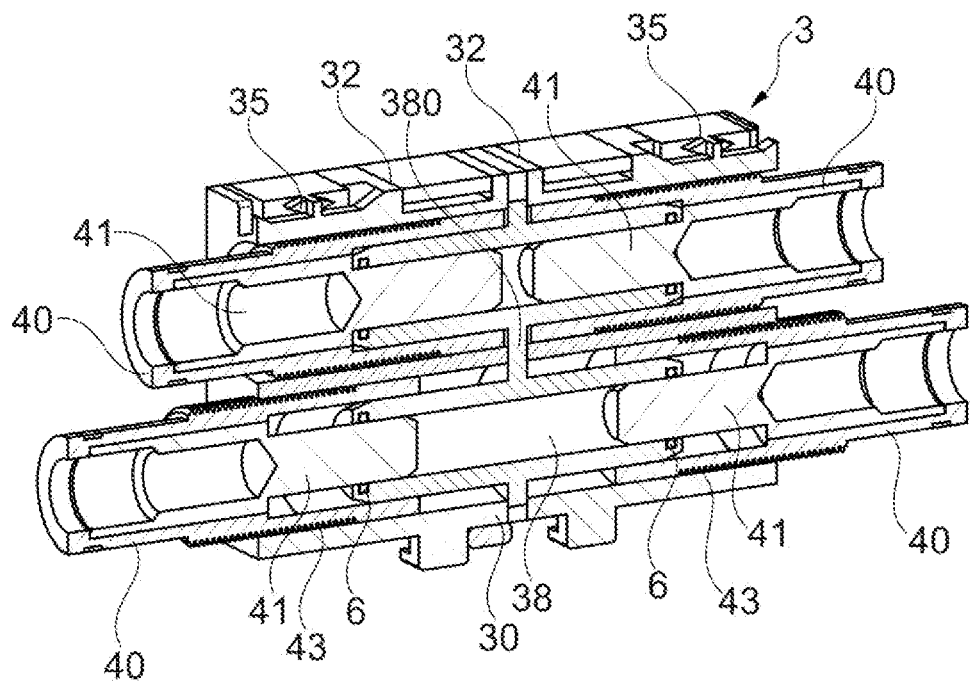
FIG. 29 illustrates a perspective and longitudinal sectional view of one embodiment of a connection module with two rows of cavities above one another and electrically connected to one another by an electric shunt internal to the module and with a latch common to two terminations that are inserted above one another into the body of the module.

As illustrated in FIGS. 29 and 30, the sealtightness between the body 30 of a module 3 and the cable terminations 4, once these have been fastened and locked inside the body, may advantageously be supplemented by the presence of toroidal seals 6. These toroidal seals 6 may advantageously be arranged:

at the inner periphery of a cavity in the electrically conductive tube 38 in a contact area with the contact 41 inserted inside, and/or at the outer periphery of a sleeve 40 on the end thereof (FIG. 30), and/or at the outer periphery of a contact 41 in a contact area with the sleeve 40 in which it is clipped (FIG. 30).

Thus, in the configuration of FIG. 29, the sealtightness of the terminations 4 in the module is created only for the electrical interface, that is to say between each contact 41 and the electrically conductive tube 38.

In the configuration of FIG. 30, complete sealtightness of all of the electrical components is guaranteed.

Figure 31:
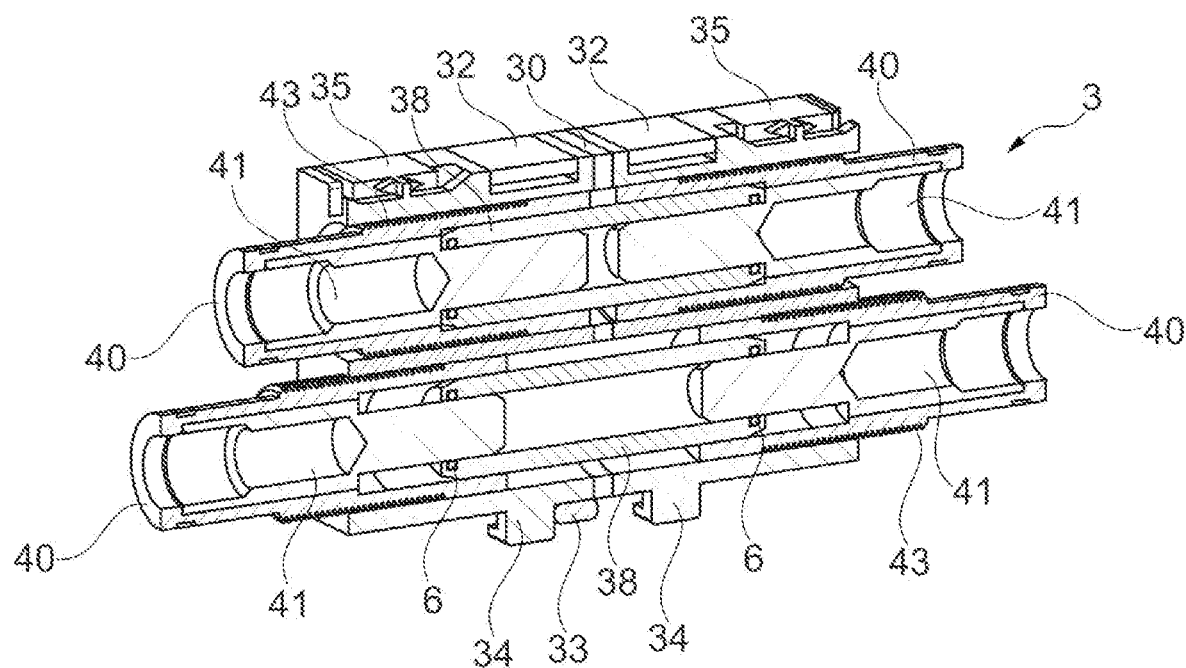
FIG. 31 reproduces FIG. 29, but without an electric shunt internal to the module.

The stops 5 may also be equipped with toroidal seals 6 at their outer periphery (FIG. 30). FIG. 31 reproduces the configuration of FIG. 29, but without the presence of a wall 380 forming the electric shunt: each conductive tube 38 electrically connecting two terminations 4 facing one another is thus independent of the other tube 38.

Other variants and improvements may be provided without otherwise departing from the scope of the invention.

Although, in the examples illustrated in FIGS. 3 to 31, the electrical connection is created between at least two electric cable terminations 4 each housed within a different cavity in the body 30 of the module, the invention may very well be implemented with a module with a single cavity for housing a cable termination to be connected to a fixed electrically conductive element connected electrically to the conductive tube 38 therein.

Figure 32:
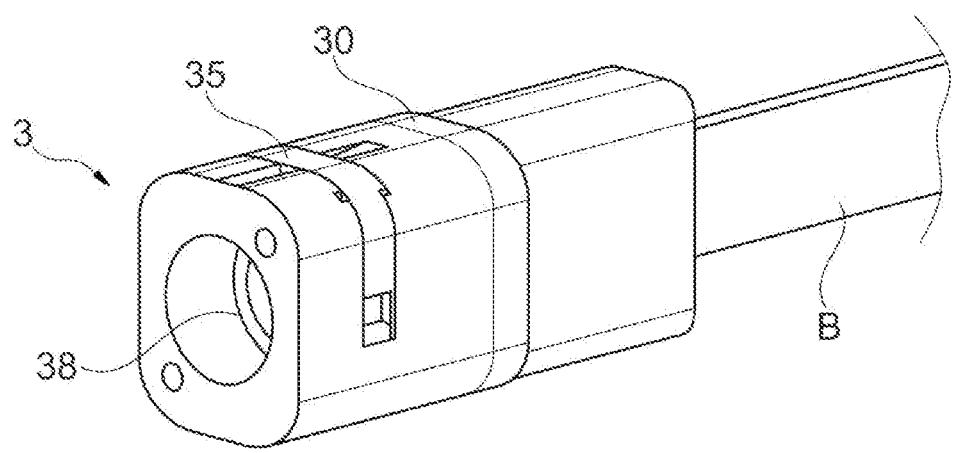
FIG. 32 is a perspective view of a connection module according to the invention with a single cavity for an electric cable termination, intended to be housed and connected inside the module, to an electrical connection bar or busbar joined to the electrically conductive tube.
Figure 33:
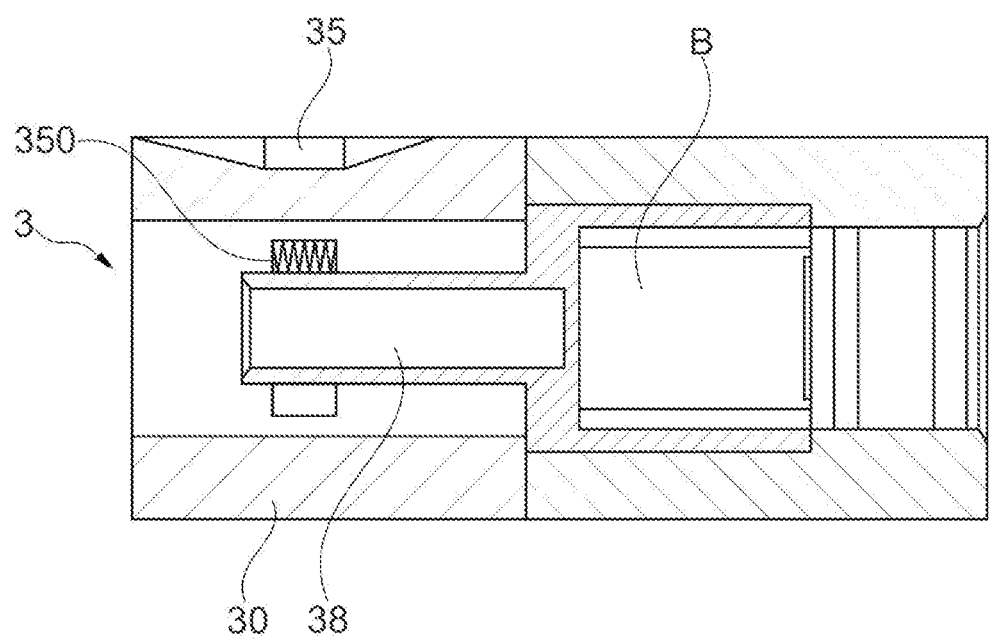
FIG. 33 is a longitudinal sectional view of FIG. 32.

Such a configuration is illustrated in FIGS. 32 and 33: the connection module 3 that is shown comprises a single cavity 31 for an electric cable termination 4, the conductive tube 38 being joined to an electrical connection bar or busbar B.

As well, although, in the illustrated examples, a connection module is fastened and locked to a support rail through a translational movement along the longitudinal axis X of the module, that is to say in the direction of the width of the rail, it is obviously possible to contemplate a translational movement in a different direction, in particular a translational movement in a direction orthogonal to the axis X, that is to say in the direction of the length of the rail.

The expression "comprising a" should be understood to be synonymous with "comprising at least one" unless the opposite is specified.

The invention claimed is:

1. An electrical connection assembly, comprising:
at least one electric cable termination, with a longitudinal axis (X1), comprising a sleeve and a contact held inside the sleeve, the contact being intended to be connected, to an electric cable, the sleeve comprising reliefs on its outer periphery;
at least one electrical connection module, with a longitudinal axis (X), comprising:
a body made of an electrically insulating material, comprising at least one cavity designed to house one contact of the electric cable terminations,
an electrically conductive tube, designed to connect at least one electric cable termination to another electrically conductive element,
at least one latch, comprising reliefs arranged towards the inside, the latch being designed to slide over the body between an unlocking position and a locking position in which the reliefs of the latch are interleaved in the complementary reliefs of a sleeve of the electric cable termination so as to block said electric cable termination in translation along the axis (X) with respect to the body, in a position in which said electric cable termination is inserted into the cavity of the body chosen from among at least two possible positions (L1, L2).

2. The electrical connection assembly according to claim 1, wherein the reliefs of the sleeve are reliefs that repeat along its longitudinal axis (X1).

3. The electrical connection assembly according to claim 1, wherein the reliefs of the latch are reliefs that repeat along the longitudinal axis (X) of the electric connection module.

4. The electrical connection assembly according to claim 2, wherein the repeating reliefs are ridges.

5. The electrical connection assembly according to claim 3, wherein the number of reliefs of the latch is less than the number of reliefs of an electric cable termination, so as to allow locking of said electric cable termination in the cavity in a variable insertion position.

6. The electrical connection assembly according to claim 1, wherein the possible insertion positions of each electric cable termination is between a first extreme insertion position, in which it is locked in a cavity from above by it being impossible to interleave with reliefs of the latch sliding into the reliefs of the sleeve of the electric cable termination, and a second extreme insertion position, in which its sleeve comes into longitudinal abutment against the conductive tube.

7. The electrical connection assembly according to claim 1, wherein the electrical connection module comprises at least two latches designed to slide over the body independently of one another.

8. The electrical connection assembly according to claim 1, comprising two aligned cavities of the module.

9. The electrical connection assembly according to claim 1, wherein the electrical connection module comprises at least two rows of two cavities arranged on top of one another.

10. The electrical connection assembly according to claim 9, wherein the two conductive tubes housed in the rows of cavities are electrically connected to one another by an electric shunt, or not being electrically connected to one another.

11. The electrical connection assembly according to claim 1, comprising at least one identification marker that, if it/they remain(s) visible after the insertion of an electric cable termination, signify/signifies that it is impossible to lock said electric cable termination.

12. The electrical connection assembly according to claim 1, wherein the electrical connection module comprises one or more gaskets arranged on the outer periphery of a contact in a contact area with the sleeve in which it is connected.

13. A terminal block connection assembly, intended to connect a plurality of electric cables to one another, comprising:
at least one connection assembly according to claim 1, the at least one electrical connection module of which furthermore comprises:
at least one positioning piece projecting from the body towards the outside of the module,
at least one locking plate, designed to slide over the body between a locking position and an unlocking position, the locking plate comprising a locking relief;
at least one support rail, intended to be fastened to a structure, comprising:
at least one insertion groove, designed for the insertion of the positioning piece,
at least one fastening groove in the extension of the insertion groove, the fastening groove being designed to allow the module to be fastened through the translational movement of the positioning piece from the insertion groove;
at least one locking relief designed to interact with the complementary locking relief of the plate when the positioning piece is moved in translation, so as to slide the plate from its unlocking position to its locking position, and thus to lock the fastening of the connection module to the support rail.

14. An electric cable termination, with a longitudinal axis (X1), comprising a sleeve and a contact held inside the sleeve, the contact being intended to be connected, to an electric cable, the sleeve comprising reliefs on its outer periphery, the reliefs being configured to ensure the locking in translation, of the electric cable termination in an electrical connection module.

15. The electric cable termination according to claim 14, wherein the sleeve comprises an area without reliefs at its front end.

16. The electric cable termination according claim 14, wherein the sleeve comprises at least one identification marker, which, if it remains visible after insertion of the termination, signifies that it is impossible to lock the termination.

17. A terminal block, comprising a plurality of electrical connection modules of a connection assembly according to claim 1, of same or different sizes, with cavities of same or different sizes for housing terminations of electric cables of same or different sizes.

18. An aircraft structure, comprising a support rail, on which is fastened at least one terminal block according to claim 17.

* * * * *